(12) United States Patent
Hu et al.

(10) Patent No.: US 12,192,127 B2
(45) Date of Patent: Jan. 7, 2025

(54) DISTRIBUTED-TONE RU ON FREQUENCY SUBBLOCK OF WIDE-BANDWIDTH PPDU

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 205 days.

(21) Appl. No.: 17/703,476

(22) Filed: Mar. 24, 2022

(65) Prior Publication Data

US 2022/0311565 A1 Sep. 29, 2022

Related U.S. Application Data

(60) Provisional application No. 63/232,277, filed on Aug. 12, 2021, provisional application No. 63/166,280, filed on Mar. 26, 2021.

(51) Int. Cl.
*H04L 5/00* (2006.01)

(52) U.S. Cl.
CPC .......... *H04L 5/0032* (2013.01); *H04L 5/0044* (2013.01); *H04L 5/005* (2013.01); *H04L 5/0094* (2013.01)

(58) Field of Classification Search
CPC .................................................... H04L 5/0032
See application file for complete search history.

(56) References Cited

U.S. PATENT DOCUMENTS

| | | | |
|---|---|---|---|
| 2020/0008185 | A1 | 1/2020 | Chen et al. |
| 2020/0014509 | A1 | 1/2020 | Asterjadhi et al. |
| 2021/0143955 | A1* | 5/2021 | Yang ................ H04L 5/003 |
| 2022/0240193 | A1* | 7/2022 | Xu .................. H04W 52/146 |

FOREIGN PATENT DOCUMENTS

| | | |
|---|---|---|
| WO | WO 2021029551 A1 | 2/2021 |
| WO | WO 2021092132 A1 | 5/2021 |

OTHER PUBLICATIONS

European Patent Office, Extended European Search Report for European Patent Application No. 22164383.6, Aug. 2, 2022.
Taiwan Intellectual Property Office, Office Action in Taiwan Patent Application No. 111111479, Oct. 11, 2023.

* cited by examiner

*Primary Examiner* — Abdeltif Ajid
(74) *Attorney, Agent, or Firm* — Andy M. Han; Han IP PLLC

(57) ABSTRACT

Various schemes pertaining to designs of a distributed-tone resource unit (dRU) on a frequency subblock of a wide-bandwidth physical-layer protocol data unit (PPDU) in 6 GHz low-power indoor (LPI) systems are described. A communication entity generates a PPDU with subcarriers of a resource unit (RU) distributed on a frequency subblock of a plurality of frequency subblocks of a wide bandwidth. The communication entity then transmits the PPDU over the wide bandwidth. Each of the plurality of frequency subblocks includes a 20 MHz, 40 MHz or 80 MHz frequency subblock. The wide bandwidth includes an 80 MHz, 160 MHz or 320 MHz bandwidth. The subcarriers of the RU are distributed on the frequency block by applying a constant shift to a dRU on a 20 MHz, 40 MHz or 80 MHz bandwidth.

13 Claims, 33 Drawing Sheets

| 242-tone RU | RU 1 [-1012: -771] | RU 2 [-765: -524] | RU 3 [-500: -259] | RU 4 [-253: -12] |
|---|---|---|---|---|
| | RU 5 [12: 253] | RU 6 [259: 500] | RU 7 [524: 765] | RU 8 [771: 1012] |

(A)

| 242-tone RU | RU 1 [-2036: -1795] | RU 2 [-1789: -1548] | RU 3 [-1524: -1283] | RU 4 [-1277: -1036] |
|---|---|---|---|---|
| | RU 5 [-1012: -771] | RU 6 [-765: -524] | RU 7 [-500: -259] | RU 8 [-253: -12] |
| | RU 9 [12: 253] | RU 10 [259: 500] | RU 11 [524: 765] | RU 12 [771: 1012] |
| | RU 13 [1036: 1277] | RU 14 [1283: 1524] | RU 15 [1548: 1789] | RU 16 [1795: 2036] |

Data and Pilot Subcarrier Indices for dRU in an 80MHz EHT TB PPDU for 6GHz LPI

1300

| dRU Type | dRU Index and Subcarrier Range | | | | | |
|---|---|---|---|---|---|---|
| 26-tone dRU | dRU1<br>[-500:37:-56, 56:37:500] | dRU2<br>[-484:37:-40, 40:37:484] | dRU3<br>[-492:37:-48, 48:37:492] | dRU4<br>[-476:37:-32, 32:37:476] | dRU5<br>[-468:37:-24, 24:37:468] | dRU6<br>[-496:37:-52, 52:37:496] |
| | dRU7<br>[-480:37:-36, 36:37:480] | dRU8<br>[-488:37:-44, 44:37:488] | dRU9<br>[-472:37:-28, 28:37:472] | dRU10<br>[-494:37:-50, 50:37:494] | dRU11<br>[-478:37:-34, 34:37:478] | dRU12<br>[-486:37:-42, 42:37:486] |
| | dRU13<br>[-470:37:-26, 26:37:470] | dRU14<br>[-466:37:-22, 22:37:466] | dRU15<br>[-498:37:-54, 54:37:498] | dRU16<br>[-482:37:-38, 38:37:482] | dRU17<br>[-490:37:-46, 46:37:490] | dRU18<br>[-474:37:-30, 30:37:474] |
| | dRU19<br>[not defined] | dRU20<br>[-499:37:-55, 55:37:499] | dRU21<br>[-483:37:-39, 39:37:483] | dRU22<br>[-491:37:-47, 47:37:491] | dRU23<br>[-475:37:-31, 31:37:475] | dRU24<br>[-467:37:-23, 23:37:467] |
| | dRU25<br>[-495:37:-51, 51:37:495] | dRU26<br>[-479:37:-35, 35:37:479] | dRU27<br>[-487:37:-43, 43:37:487] | dRU28<br>[-471:37:-27, 27:37:471] | dRU29<br>[-493:37:-49, 49:37:493] | dRU30<br>[-477:37:-33, 33:37:477] |
| | dRU31<br>[-485:37:-41, 41:37:485] | dRU32<br>[-469:37:-25, 25:37:469] | dRU33<br>[-465:37:-21, 21:37:465] | dRU34<br>[-497:37:-53, 53:37:497] | dRU35<br>[-481:37:-37, 37:37:481] | dRU36<br>[-489:37:-45, 45:37:489] |
| | dRU37<br>[-473:37:-29, 29:37:473] | | | | | |

FIG. 13A

Table 1300 — Data and Pilot Subcarrier Indices for dRU in an 80MHz EHT TB PPDU for 6GHz LPI

| dRU Type | dRU Index and Subcarrier Range | | | | | |
|---|---|---|---|---|---|---|
| 52-tone dRU $i = 1:16$ | dRU1<br>26-tone [dRU1, dRU2] | dRU2<br>26-tone [dRU3, dRU4] | dRU3<br>26-tone [dRU5, dRU7] | dRU4<br>26-tone [dRU8, dRU9] | dRU5<br>26-tone [dRU10, dRU11] | dRU6<br>26-tone [dRU12, dRU13] |
|  | dRU7<br>26-tone [dRU15, dRU16] | dRU8<br>26-tone [dRU17, dRU18] | dRU9<br>26-tone [dRU20, dRU21] | dRU10<br>26-tone [dRU22, dRU23] | dRU11<br>26-tone [dRU25, dRU26] | dRU12<br>26-tone [dRU27, dRU28] |
|  | dRU13<br>26-tone [dRU29, dRU30] | dRU14<br>26-tone [dRU31, dRU32] | dRU15<br>26-tone [dRU34, dRU35] | dRU16<br>26-tone [dRU36, dRU37] | | |
| 106-tone dRU $i = 1:8$ | dRU1<br>26-tone [dRU1~4], [-19,19] | dRU2<br>26-tone [dRU6~9], [-15,15] | dRU3<br>26-tone [dRU10~13], [-13,13] | dRU4<br>26-tone [dRU15~18], [-17,17] | dRU5<br>26-tone [dRU20~23], [-18,18] | dRU6<br>26-tone [dRU25~28], [-14,14] |
|  | dRU7<br>26-tone [dRU29~32], [-12,12] | dRU8<br>26-tone [dRU34~37], [-16,16] | | | | |
| 242-tone dRU $i = 1:4$ | dRU1<br>106-tone [dRU1 ~ dRU2], [-11,-7,7,11], 26-tone dRUs | | dRU2<br>106-tone [dRU3 ~ dRU4], [-9,5,5,9], 26-tone dRUs | | dRU3<br>106-tone [dRU5 ~ dRU6], [-10,-6,6,10], 26-tone dRUs | |
|  | dRU4<br>106-tone [dRU7 ~ dRU8], [-8,-4,4,8], 26-tone dRUs | | | | | |
| 484-tone dRU $i = 1:2$ | dRU1<br>242-tone [dRU1 ~ dRU2] | | dRU2<br>242-tone [dRU3 ~ dRU4] | | | |

FIG. 13B

| Frequency Subblock Size | BW80 | BW160 | BW320 |
|---|---|---|---|
| 20MHz | 120 + [-500, -253, 12, 259] | 120 + [-1012, -765, -500, -253, 12, 259, 524, 771] | 120 + [-2036, -1789, -1524, -127, 7, -1012, -765, -500, -253, 12, 259, 524, 771, 1036, 1283, 1548, 1795] |
| 40MHz | [-1, 1] * 256 | [-3, -1, 1, 3] * 256 | [-7, -5, -3, -1, 1, 3, 5, 7] * 256 |
| 80MHz | 0 | [-1, 1] * 512 | [-3, -1, 1, 3] * 512 |

| Frequency Subblock Size | BW80 | BW160 | BW320 |
|---|---|---|---|
| 20MHz | [-380, -133, 132, 379] | [-892, -645, -380, -133, 132, 379, 644, 891] | [-1916, -1669, -1404, -1157, -892, -645, -380, -133, 132, 379, 644, 891, 1156, 1403, 1668, 1915] |
| 40MHz | [-256, 256] | [-768, -256, 256, 768] | [-1792, -1280, -768, -256, 256, 768, 1280, 1792] |
| 80MHz | 0 | [-512, 512] | [-1536, -512, 512, 1536] |

$$i = \begin{cases} 4*N + M, & \text{for dRU on 20MHz subblock} \\ 2*N + M, & \text{for dRU on 40MHz subblock} \\ N, & \text{for dRU on 80MHz subblock} \end{cases}$$

(B)

| B7-B1 of the RU Allocation subfield | RU size | 20MHz subblock index $M$ in 80MHz | 40MHz subblock index $M$ in 80MHz |
|---|---|---|---|
| 0-8 | 26 | 0 | 0 |
| 9-17 | | 1 | 0 |
| 18 | | reserved | reserved |
| 19-27 | 52 | 2 | 1 |
| 28-36 | | 3 | 1 |
| 37-40 | 106 | 0 | 0 |
| 41-44 | | 1 | 0 |
| 45-48 | | 2 | 1 |
| 49-52 | | 3 | 1 |
| 53, 54 | 242 | 0 | 0 |
| 55, 56 | | 1 | 0 |
| 57, 58 | | 2 | 1 |
| 59, 60 | | 3 | 1 |
| 61 | 484 | 0 | 0 |
| 62 | | 1 | 0 |
| 63 | | 2 | 1 |
| 64 | | 3 | 1 |
| 65 | | NA | 0 |
| 66 | | NA | 1 |

FIG. 23

$$k_{dRU\_M\_N} = k_{dRU} + K_{shift1}(M) + K_{shift2}(N)$$

2500

K$_{shift1}$ for dRU on subblock 20/40/80MHz inside 80MHz

| Frequency Subblock Size | K$_{shift1}$ |
|---|---|
| 20MHz (M = 0, 1, 2, 3) | [-380, -133, 132, 379] |
| 40MHz (M = 0, 1) | [-256, 256] |
| 80MHz (M = 0) | 0 |

K$_{shift2}$ for dRU on subblock 80MHz inside 80/160/320MHz

| Bandwidth | K$_{shift2}$ |
|---|---|
| 80MHz (N = 0) | 0 |
| 160MHz (N = 0, 1) | [-512, 512] |
| 80MHz (N = 0, 1, 2, 3) | [-1536, -512, 512, 1536] |

FIG. 25

Data and Pilot Subcarrier Indices for dRU in a 20MHz EHT PPDU

2700

| dRU Type | dRU Index and Subcarrier Range | | | | |
|---|---|---|---|---|---|
| 26-tone dRU<br>i = 1:9 | dRU1<br>[-120:9:-12, 6:9:114] | dRU2<br>[-116:9:-8, 10:9:118] | dRU3<br>[-118:9:-10, 8:9:116] | dRU4<br>[-114:9:-6, 12:9:120] | dRU5<br>[-112:9:-4, 5:9:113] |
| | dRU6<br>[-119:9:-11, 7:9:115] | dRU7<br>[-115:9:-7, 11:9:119] | dRU8<br>[-117:9:-9, 9:9:117] | dRU9<br>[-113:9:-5, 4:9:112] | |
| 52-tone dRU<br>i = 1:4 | dRU1<br>26-tone [dRU1, dRU2] | | dRU2<br>26-tone [dRU3, dRU4] | | |
| | dRU3<br>26-tone [dRU6, dRU7] | | dRU4<br>26-tone [dRU8, dRU9] | | |
| 106-tone dRU<br>i = 1:2 | dRU1<br>26-tone [dRU1 ~ dRU4], [-3, 3] | | dRU2<br>26-tone [dRU6 ~ dRU9], [-2, 2] | | |

FIG. 27

Data and Pilot Subcarrier Indices for dRU in a 40MHz EHT PPDU

2800

| dRU Type | dRU Index and Subcarrier Range | | | | | |
|---|---|---|---|---|---|---|
| 26-tone dRU<br>i = 1:18 | dRU1<br>[-242:18:-26,<br>10:18:226] | dRU2<br>[-233:18:-17,<br>19:18:235] | dRU3<br>[-238:18:-22,<br>14:18:230] | dRU4<br>[-229:18:-13,<br>23:18:239] | dRU5<br>[-225:18:-9,<br>27:18:243] | dRU6<br>[-240:18:-24,<br>12:18:228] |
| | dRU7<br>[-231:18:-15,<br>21:18:237] | dRU8<br>[-236:18:-20,<br>16:18:232] | dRU9<br>[-227:18:-11,<br>25:18:241] | dRU10<br>[-241:18:-25,<br>11:18:227] | dRU11<br>[-232:18:-16,<br>20:18:236] | dRU12<br>[-237:18:-21,<br>15:18:231] |
| | dRU13<br>[-228:18:-12,<br>24:18:240] | dRU14<br>[-234:18:-18,<br>18:18:234] | dRU15<br>[-239:18:-23,<br>13:18:229] | dRU16<br>[-230:18:-14,<br>22:18:238] | dRU17<br>[-235:18:-19,<br>17:18:233] | dRU18<br>[-226:18:-10,<br>26:18:242] |
| 52-tone dRU<br>i = 1:8 | dRU1<br>[-242:9:-17, 10:9:235] | dRU2<br>[-238:9:-13, 14:9:239] | | dRU3<br>[-240:9:-15, 12:9:237] | | |
| | dRU4<br>[-236:9:-11, 16:9:241] | dRU5<br>[-241:9:-16, 11:9:236] | | dRU6<br>[-237:9:-12, 15:9:240] | | |
| | dRU7<br>[-239:9:-14, 13:9:238] | dRU8<br>[-235:9:-10, 17:9:242] | | | | |
| 106-tone dRU<br>i = 1:4 | dRU1<br>26-tone [dRU1 ~ dRU4], [-8, 5] | dRU2<br>26-tone [dRU6 ~ dRU9], [-6, 7] | | dRU3<br>26-tone [dRU10 ~ dRU13], [-7, 6] | | |
| | dRU4<br>26-tone [dRU15 ~ dRU18]; [-5, 8] | | | | | |
| 242-tone dRU<br>i = 1:2 | dRU1<br>106-tone [dRU1 ~ dRU2], 26-tone dRU5,<br>[-244, -4, 3, 9] | dRU2<br>106-tone [dRU3 ~ dRU4], 26-tone dRU14,<br>[-243, -3, 4, 244] | | | | |

FIG. 28

Data and Pilot Subcarrier Indices for dRU in an 80MHz EHT PPDU

2900

| dRU Type | dRU Index and Subcarrier Range | | | |
|---|---|---|---|---|
| 52-tone dRU<br>i = 1:16 | dRU1<br>[-483:36:-51, 17:36:449],<br>[-467:36:-35, 33:36:465] | dRU2<br>[-475:36:-43, 25:36:456],<br>[-459:36:-27, 41:36:473] | dRU3<br>[-479:36:-47, 21:36:453],<br>[-463:36:-31, 37:36:469] | dRU4<br>[-471:36:-39, 29:36:461],<br>[-455:36:-23, 45:36:477] |
| | dRU5<br>[-477:36:-45, 23:36:455],<br>[-461:36:-29, 39:36:471] | dRU6<br>[-469:36:-37, 31:36:463],<br>[-453:36:-21, 47:36:479] | dRU7<br>[-481:36:-49, 9:36:451],<br>[-465:36:-33, 35:36:467] | dRU8<br>[-473:36:-41, 27:36:459],<br>[-457:36:-25, 43:36:475] |
| | dRU9<br>[-482:36:-50, 18:36:450],<br>[-466:36:-34, 34:36:466] | dRU10<br>[-474:36:-42, 26:36:458],<br>[-458:36:-26, 42:36:474] | dRU11<br>[-478:36:-46, 22:36:454],<br>[-462:36:-30, 38:36:470] | dRU12<br>[-470:36:-38, 30:36:462],<br>[-454:36:-22, 46:36:478] |
| | dRU13<br>[-476:36:-44, 24:36:456],<br>[-460:36:-28, 40:36:472] | dRU14<br>[-468:36:-36, 32:36:464],<br>[-452:36:-20, 48:36:480] | dRU15<br>[-480:36:-48, 20:36:452],<br>[-464:36:-32, 36:36:468] | dRU16<br>[-472:36:-40, 28:36:460],<br>[-456:36:-24, 44:36:476] |
| 106-tone dRU<br>i = 1:8 | dRU1<br>52-tone [dRU1 ~ dRU2],<br>[-495, 485] | dRU2<br>52-tone [dRU3 ~ dRU4],<br>[-491, 489] | dRU3<br>52-tone [dRU5 ~ dRU6],<br>[-489, 491] | dRU4<br>52-tone [dRU7 ~ dRU8],<br>[-493, 487] |
| | dRU5<br>52-tone [dRU9 ~ dRU10],<br>[-494, 486] | dRU6<br>52-tone [dRU11 ~ dRU12],<br>[-490, 490] | dRU7<br>52-tone [dRU13 ~ dRU14],<br>[-488, 492] | dRU8<br>52-tone [dRU15 ~ dRU16],<br>[-492, 488] |
| 242-tone dRU<br>i = 1:4 | dRU1<br>[-499:4:-19, 17:4:497] | dRU2<br>[-497:4:-17, 19:4:499] | | |
| | dRU3<br>[-498:4:-18, 18:4:498] | dRU4<br>[-496:4:-16, 20:4:500] | | |
| 484-tone dRU<br>i = 1:2 | dRU1<br>[-499:2:-17, 17:2:499] | dRU2<br>[-498:2:-16, 18:2:500] | | |

FIG. 29

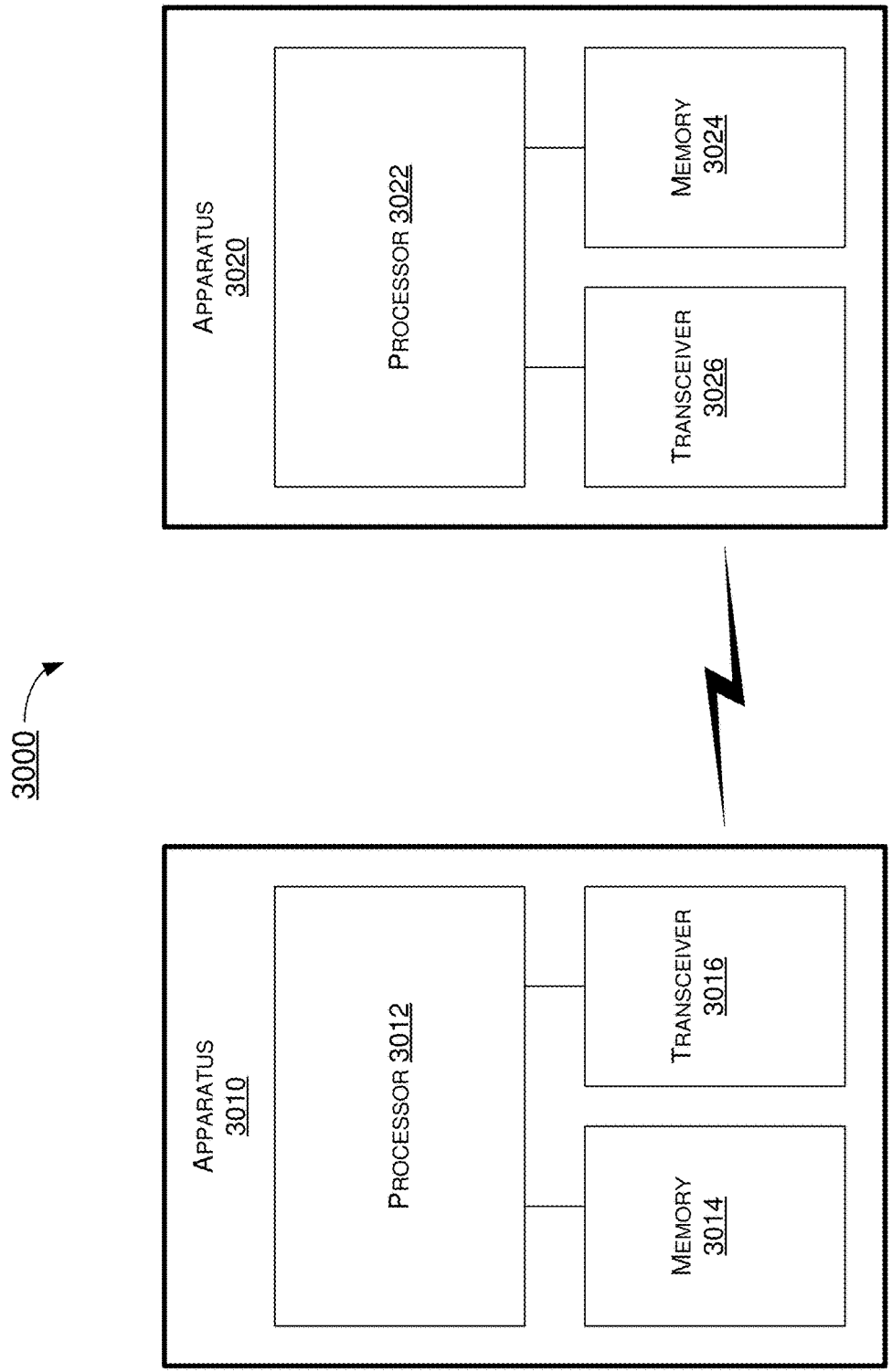

3100 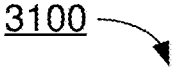

GENERATE A PHYSICAL-LAYER PROTOCOL DATA UNIT (PPDU) WITH SUBCARRIERS OF A RESOURCE UNIT (RU) DISTRIBUTED ON A FREQUENCY SUBBLOCK OF A PLURALITY OF FREQUENCY SUBBLOCKS OF A WIDE BANDWIDTH

- EACH OF THE PLURALITY OF FREQUENCY SUBBLOCKS COMPRISES A 20MHz, 40MHz OR 80MHz FREQUENCY SUBBLOCK
- THE WIDE BANDWIDTH COMPRISES AN 80MHz, 160MHz OR 320MHz BANDWIDTH
- THE SUBCARRIERS OF THE RU ARE DISTRIBUTED ON THE FREQUENCY BLOCK BY APPLYING A CONSTANT SHIFT TO A DISTRIBUTED-TONE RU (dRU) ON A 20MHz, 40MHz OR 80MHz BANDWIDTH

3110

TRANSMIT THE PPDU OVER THE WIDE BANDWIDTH
3120

GENERATE A DISTRIBUTED-TONE RESOURCE UNIT (DRU) WITH SUBCARRIERS OF THE DRU DISTRIBUTED ON A FREQUENCY SUBBLOCK OF TWO OR MORE FREQUENCY SUBBLOCKS IN A BANDWIDTH, WITH THE DRU GENERATED ON:

- A 20MHZ FREQUENCY SUBBLOCK WITH THE BANDWIDTH BEING 40MHZ, 80MHZ, 160MHZ OR 320MHZ, OR
- A 40MHZ FREQUENCY SUBBLOCK WITH THE BANDWIDTH BEING 80MHZ, 160MHZ OR 320MHZ, OR
- AN 80MHZ FREQUENCY SUBBLOCK WITH THE BANDWIDTH BEING 160MHZ OR 320MHZ, OR
- A 160MHZ FREQUENCY SUBBLOCK WITH THE BANDWIDTH BEING 320MHZ

3210

COMMUNICATE USING THE DRU
3220

FIG. 32

DISTRIBUTED-TONE RU ON FREQUENCY SUBBLOCK OF WIDE-BANDWIDTH PPDU

CROSS REFERENCE TO RELATED PATENT APPLICATION

The present disclosure is part of a non-provisional patent application claiming the priority benefit of U.S. Provisional Patent Application Nos. 63/166,280 and 63/232,277, filed 26 Mar. 2021 and 12 Aug. 2021, respectively, the contents of which being incorporated by reference in their entirety.

TECHNICAL FIELD

The present disclosure is generally related to wireless communications and, more particularly, to designs of a distributed-tone resource unit (dRU) on a frequency subblock of a wide-bandwidth physical-layer protocol data unit (PPDU) in 6 GHz low-power indoor (LPI) systems.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4 GHz and 5 GHz bands, the equivalent isotropically radiated power (EIRP) of a power spectral density (PSD) limit is capped at 20 dBm for 2 MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6 GHz LPI applications is far more stringent than PSD requirement for the 2.4 GHz and 5 GHz bands. For instance, the EIRP limit is at 5 dBm/MHz for an access point (AP) station (STA) in 6 GHz LPI versus an EIRP limit of 17 dBm/MHz for APs in the 5 GHz band. Similarly, the EIRP limit is at −1 dBm/MHz for an non-AP STA in 6 GHz LPI versus an EIRP limit of 11 dBm/MHz for APs in the 5 GHz band.

Distributed-tone resource units (dRUs) and distributed-tone multi-RUs (dMRUs) have been proposed to spread subcarriers or tones over a wider bandwidth to boost transmit power and extend coverage range, and several different operational modes and scenarios have been proposed. Some of the dRU operational modes, such as a hybrid mode with a regular RU (rRU) on one frequency segment/subblock and a dRU on other frequency segments/subblocks, require tone distribution to be performed on only a certain frequency segment or subblock of a given bandwidth, instead of the entire bandwidth. For example, dRUs may be distributed within a 20 MHz segment/subblock of an 80 MHz bandwidth, within a 40 MHz or 80 MHz segment/subblock of a 160 MHz bandwidth, and so on, without the tone distribution crossing any distribution window/bandwidth boundary. However, how tones or subcarriers of RUs are distributed on frequency subblocks of a wide-bandwidth PPDU has yet to be defined. Therefore, there is a need for a solution for designs of a dRU on a frequency subblock of a wide-bandwidth PPDU in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to designs of a dRU on a frequency subblock of a wide-bandwidth PPDU in 6 GHz LPI systems. It is believed that, under various proposed schemes in accordance with the present disclosure, a dRU may be distributed on a 20 MHz frequency segment/subblock of a 40 MHz, 80 MHz, 160 MHz or 320 MHz bandwidth, on a 40 MHz frequency segment/subblock of an 80 MHz, 160 MHz or 320 MHz bandwidth, on an 80 MHz frequency segment/subblock of a 160 MHz or 320 MHz bandwidth, or on a 160 MHz frequency segment/subblock of a 320 MHz bandwidth. Moreover, under various proposed schemes in accordance with the present disclosure, dRU(s) designed on 20 MHz, 40 MHz and/or 80 MHz bandwidth(s) may be distributed on frequency subblocks of a wide-bandwidth PPDU with a constant shift.

In one aspect, a method may involve generating a PPDU with subcarriers of a resource unit (RU) distributed on a frequency subblock of a plurality of frequency subblocks of a wide bandwidth. The method may also involve transmitting the PPDU over the wide bandwidth. Each of the plurality of frequency subblocks may include a 20 MHz, 40 MHz or 80 MHz frequency subblock. The wide bandwidth may include an 80 MHz, 160 MHz or 320 MHz bandwidth. The subcarriers of the RU may be distributed on the frequency block by applying a constant shift to a dRU on a 20 MHz, 40 MHz or 80 MHz bandwidth.

In another aspect, a method may involve generating a dRU with subcarriers of the dRU distributed on a frequency subblock of two or more frequency subblocks in a bandwidth. The method may also involve communicating using the dRU. The dRU may be generated on: (a) a 20 MHz frequency subblock with the bandwidth being 40 MHz, 80 MHz, 160 MHz or 320 MHz, or (b) a 40 MHz frequency subblock with the bandwidth being 80 MHz, 160 MHz or 320 MHz, or (c) an 80 MHz frequency subblock with the bandwidth being 160 MHz or 320 MHz, or (d) a 160 MHz frequency subblock with the bandwidth being 320 MHz.

In yet another aspect, an apparatus may include a transceiver configured to transmit and receive wirelessly. The apparatus may also include a processor coupled to the transceiver. The processor may generate a PPDU with subcarriers of a RU distributed on a frequency subblock of a plurality of frequency subblocks of a wide bandwidth. The processor may also transmit, via the transceiver, the PPDU over the wide bandwidth. Each of the plurality of frequency subblocks may include a 20 MHz, 40 MHz or 80 MHz frequency subblock. The wide bandwidth may include an 80 MHz, 160 MHz or 320 MHz bandwidth. The subcarriers of the RU may be distributed on the frequency block by applying a constant shift to a dRU on a 20 MHz, 40 MHz or 80 MHz bandwidth.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 8 is a diagram of an example design in accordance with an implementation of the present disclosure.

FIG. 13A and FIG. 13B each is a diagram of a respective portion of an example design in accordance with an implementation of the present disclosure.

FIG. 22 is a diagram of an example design in accordance with an implementation of the present disclosure.

FIG. 23 is a diagram of an example design in accordance with an implementation of the present disclosure.

FIG. 25 is a diagram of an example design in accordance with an implementation of the present disclosure.

FIG. 27 is a diagram of an example design in accordance with an implementation of the present disclosure.

FIG. 28 is a diagram of an example design in accordance with an implementation of the present disclosure.

FIG. 29 is a diagram of an example design in accordance with an implementation of the present disclosure.

FIG. 30 is a block diagram of an example communication system in accordance with an implementation of the present disclosure.

FIG. 31 is a flowchart of an example process in accordance with an implementation of the present disclosure.

FIG. 32 is a flowchart of an example process in accordance with an implementation of the present disclosure.

DETAILED DESCRIPTION OF PREFERRED EMBODIMENTS

Figure 1:
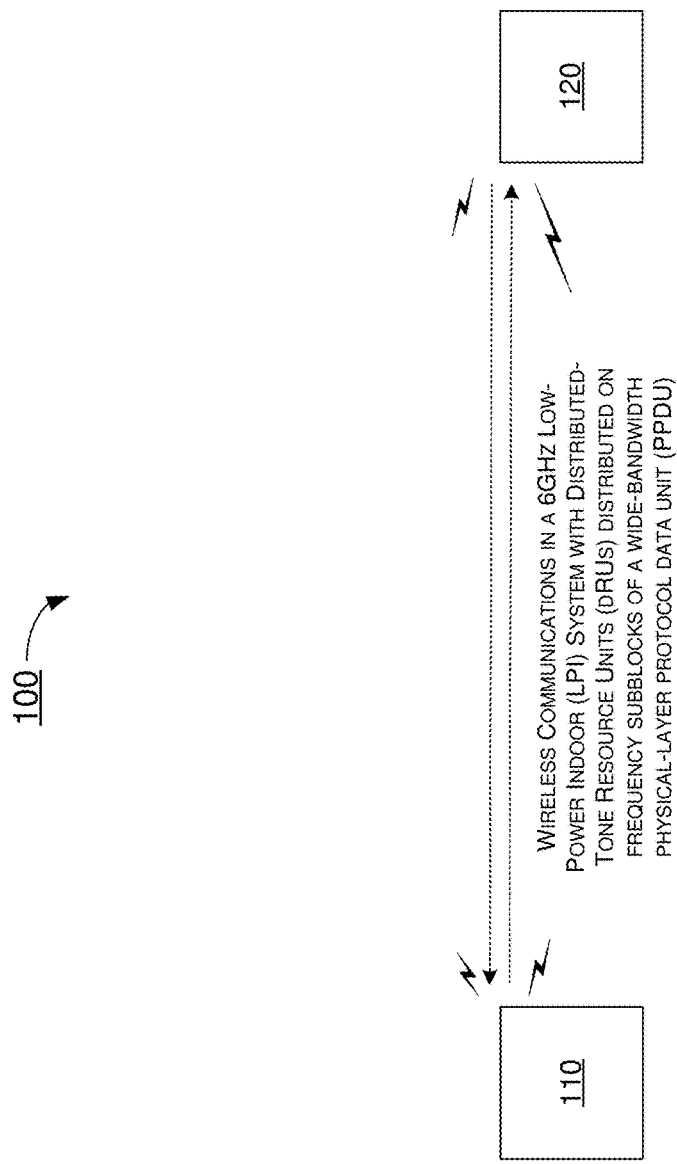
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to designs of a dRU on a frequency subblock of a wide-bandwidth PPDU in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, and a bandwidth of 320 MHz may be interchangeably denoted as BW320 or BW320M. It is further noteworthy that, in the present disclosure, a 26-tone interleaved-tone or interlaced-tone RU may be interchangeably denoted as iRU26, a 52-tone interleaved-tone or interlaced-tone RU may be interchangeably denoted as iRU52, a 106-tone interleaved-tone or interlaced-tone RU may be interchangeably denoted as iRU106, a 242-tone interleaved-tone or interlaced-tone RU may be interchangeably denoted as iRU242, and a 484-tone interleaved-tone or interlaced-tone RU may be interchangeably denoted as iRU484. Additionally, the term "frequency segment" is interchangeably referred to as "frequency subblock" herein.

FIG. 1 illustrates an example network environment 100 in which various solutions and schemes in accordance with the present disclosure may be implemented. FIG. 2~FIG. 32 illustrate examples of implementation of various proposed schemes in network environment 100 in accordance with the present disclosure. The following description of various proposed schemes is provided with reference to FIG. 1~FIG. 32.

Referring to FIG. 1, network environment 100 may involve a communication entity 110 and a communication entity 120 communicating wirelessly (e.g., in a wireless local area network (WLAN) in accordance with one or more Institute of Electrical and Electronics Engineers (IEEE) 802.11 standards). For instance, communication entity 110 may be a first STA and communication entity 120 may be a second STA, with each of the first STA and second STA functioning as either an AP STA or a non-AP STA. Under various proposed schemes in accordance with the present disclosure, communication entity 110 and communication entity 120 may be configured to communicate wirelessly with designs of a dRU on a frequency subblock of a wide-bandwidth PPDU in 6 GHz LPI systems under various proposed schemes of the present disclosure, as described herein.

Figure 2:
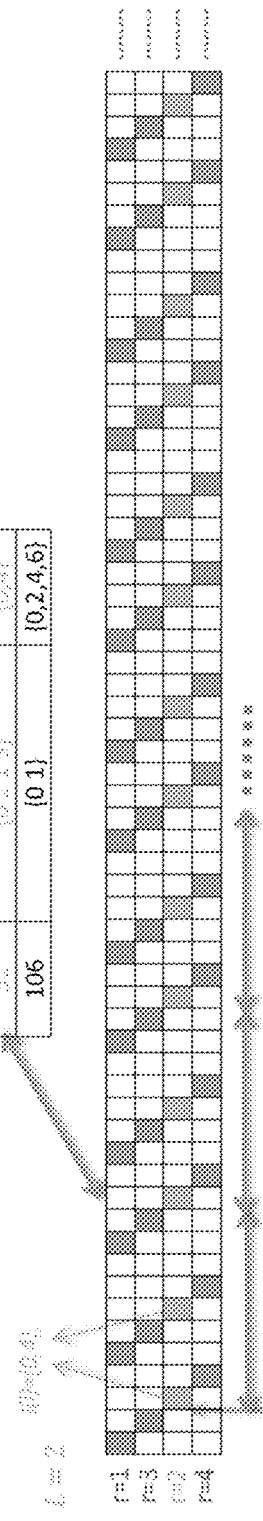
FIG. 2 is a diagram of an example design in accordance with an implementation of the present disclosure.

FIG. 2 illustrates an example design 200 of a dRU based on a 26-tone RU under a proposed scheme in accordance with the present disclosure. Referring to part (A) of FIG. 2, under the proposed scheme, given a distribution bandwidth and a logical RU size, the tone distribution pattern of a dRU may be generated from a formula as follows:

$$K_{td}(r,k)=RU_{start}(r)+l_i+j*N_p$$

Here, $N_p$ denotes a periodicity; $l_i$ denotes a tone distribution pattern during the periodicity; $i=0, 1, 2, \ldots, L-1$; $j=0, 1, 2, \ldots,$ $$\left\lceil \frac{N_{st\_ru}}{L} \right\rceil - 1;$$

$k=0, 1, 2, \ldots, N_{st\_ru}-1$; $r=1, 2, \ldots, N_{ru}$, with r being the logical RU index. Moreover, $l_i \in \Omega_{ru}=\{l_0, l_1, \ldots, l_{L-1}\}$; $L=|\Omega_{ru}|$; $N_{st\_ru}=26, 52, 106, 242, 484, 996$ for RU26, RU52, RU106, RU242, RU484, RU996, respectively. Under the proposed scheme, $RU_{start}(r)$ represents the first or starting tone index for $dRU_r$; $l_i$ represents the tones within one repetition distance or one repetition period; $N_p$ represents the repetition distance or repetition period; L represents the number of tones within one repetition distance or one repetition period; $N_{st\_ru}$ represents the number of subcarriers (or tones) for a dRU; and $N_{ru}$ represents the number of RUs or dRUs for a given RU or dRU size in a given bandwidth. Referring to part (B) of FIG. 2, an example of dRU over BW20, with a RU size of 26, 52 or 106.

Figure 3:
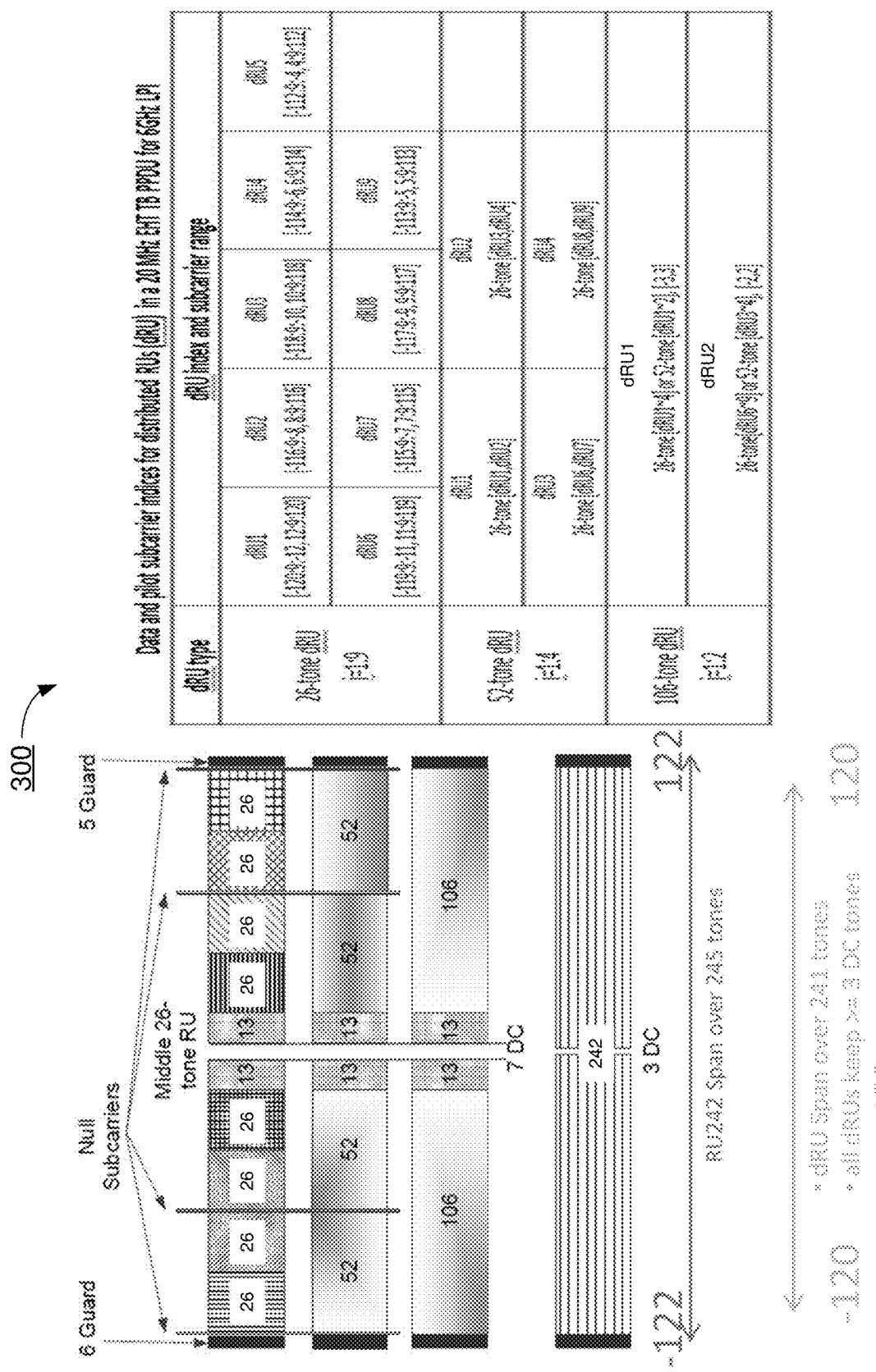
FIG. 3 is a diagram of an example design in accordance with an implementation of the present disclosure.
Figure 4:
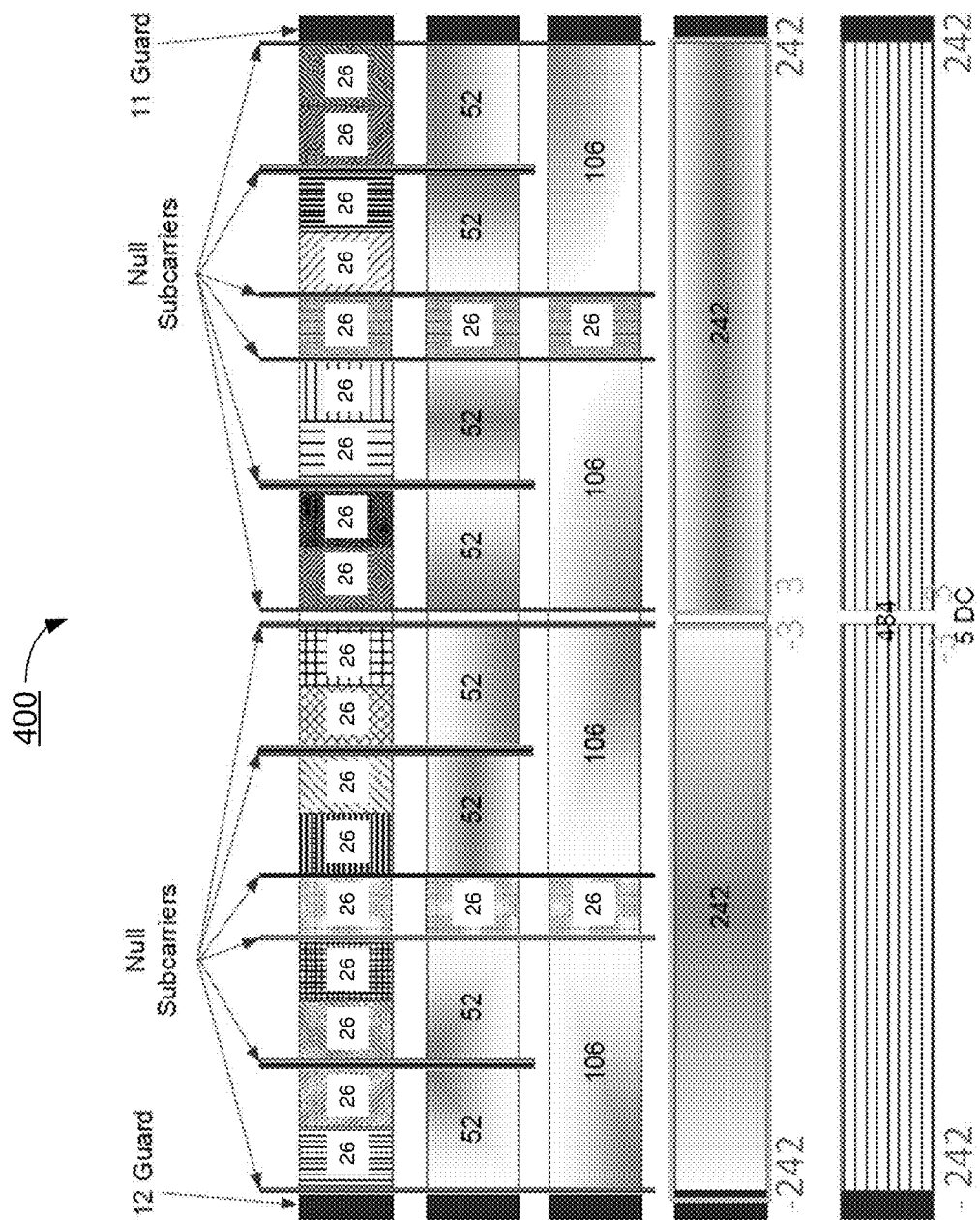
FIG. 4 is a diagram of an example design in accordance with an implementation of the present disclosure.
Figure 5:
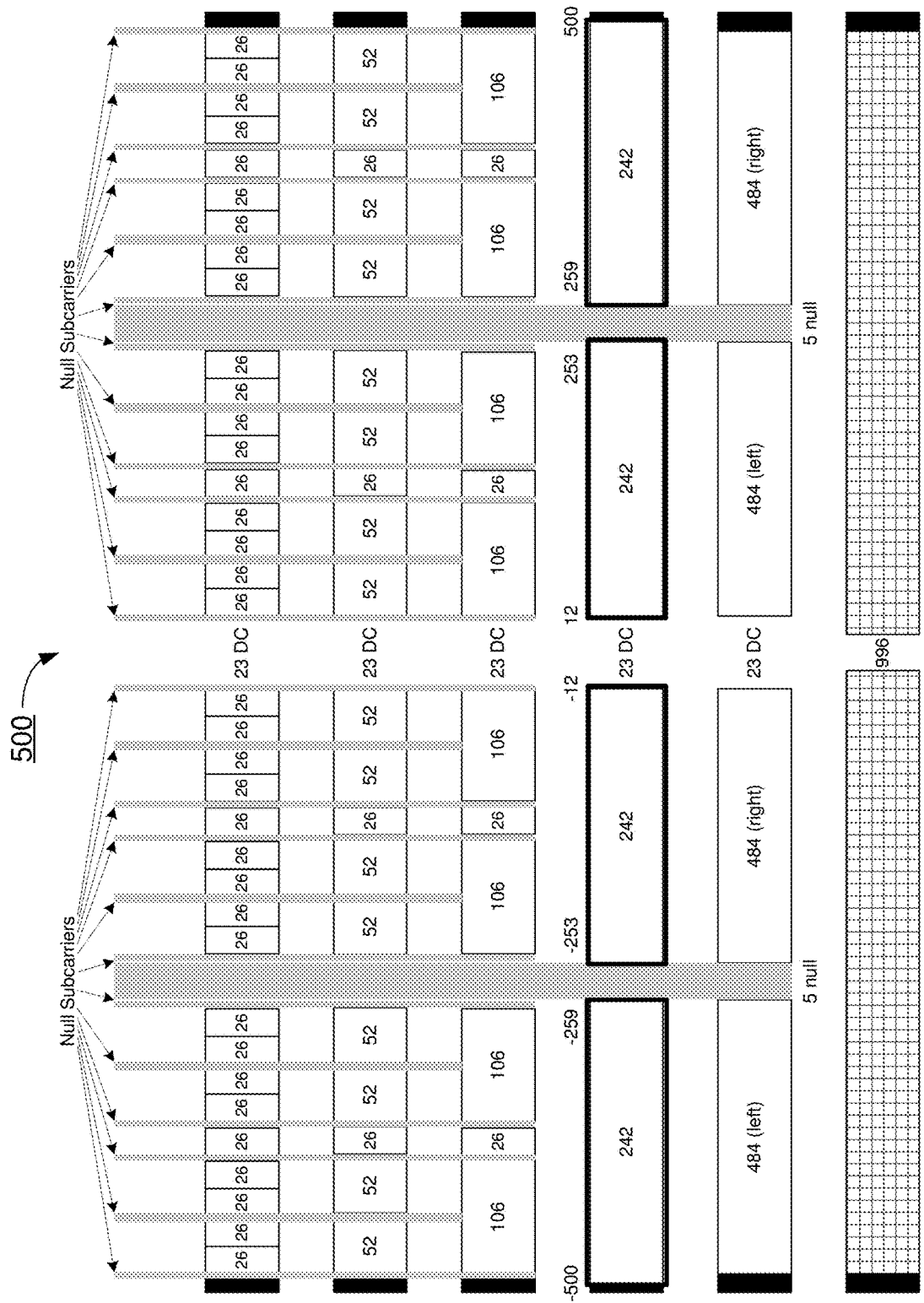
FIG. 5 is a diagram of an example design in accordance with an implementation of the present disclosure.

FIG. 3, FIG. 4 and FIG. 5 illustrate example designs 300, 400 and 500, respectively, with respect to distribution of a dRU on a frequency subblock under a proposed scheme in accordance with the present disclosure. Referring to FIG. 3, scenario 300 shows an example of distribution of a dRU on BW20. In scenario 300, the span of tone distribution of the dRU is over 241 tones. Additionally, all dRUs may have at least three direct-current (DC) tones (>=3 DC tones) around a DC in the center of tone distribution of the dRU. Moreover, in the present disclosure, the first left-hand side tone of an overall dRU table on BW20 is denoted as K1st_bw20 (e.g., K1st_bw20=−120 in the table of dRU tone indices shown in FIG. 3). Referring to FIG. 4, scenario 400 shows an example of distribution of a dRU on two 20 MHz frequency subblocks over a 40 MHz bandwidth. Referring to FIG. 5, scenario 500 shows an example of distribution of a dRU on four 20 MHz frequency subblocks over an 80 MHz bandwidth.

Figure 6:
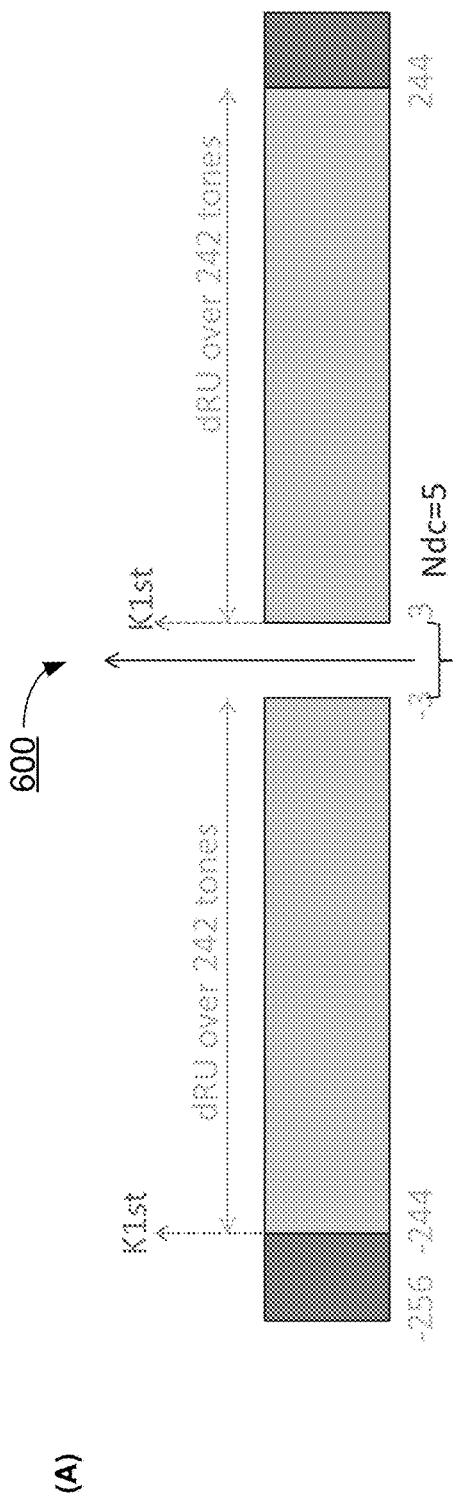
FIG. 6 is a diagram of an example design in accordance with an implementation of the present disclosure.

FIG. 6 illustrates an example design 600 of distribution of a dRU on 20 MHz frequency subblocks over BW40 under a first option (Option 1) of a proposed scheme in accordance with the present disclosure. In design 600, a parameter K1st may be defined as a first left-hand side tone of a given frequency segment/subblock, and K1st is subblock-dependent. For instance, as shown in part (A) of FIG. 6, K1st=−244 for the first 20 MHz frequency subblock of the 40 MHz bandwidth, and K1st=3 for the second 20 MHz frequency subblock of the 40 MHz bandwidth.

Using a first method under Option 1 of the proposed scheme, distribution or tone indices of the dRU may be expressed as $dRU_{BW20}+(-K1st\_bw20+K1st)$, where $dRU_{BW20}$ denotes dRU indices on BW20, K1st_bw20 denotes a corresponding value of K1st for BW20, and "dRU-K1st_bw20" represents normalization to render tone index to start from "0" (e.g., K1st_bw20=−120). It is noteworthy that the first method may maintain the same dRU tone pattern as dRU on BW20. Using a second method under Option 1 of the proposed scheme, distribution or tone indices of the dRU may be expressed as dRU=Tone-Range (dTP), with Tone-Range being subblock-dependent. For instance, Tone-Range=[−244:−3] for the first (or lower) 20 MHz frequency subblock of the 40 MHz bandwidth, and Tone-Range=[3:244] for the second (or upper) 20 MHz frequency subblock of the 40 MHz bandwidth. As shown in the dTP table in part (B) of FIG. 6, dTP table of indices may be positive integers which represent the tone distribution pattern, and the dRU tone indices may be generated by mapping or selecting the tones from "Tone-Range" based on dTP. For instance, Tone-Range=[−120:−2, 2:120] for dRU on BW20. It is noteworthy that both Tone-Range and dTP may have other values depending on dRU design. Using a third method under Option 1 of the proposed scheme, distribution or tone indices of the dRU may be expressed as $k=K1st+k_{td}$, with $k_{td}$ being a tone distribution pattern generated as described above with respect to design 200.

Figure 7:
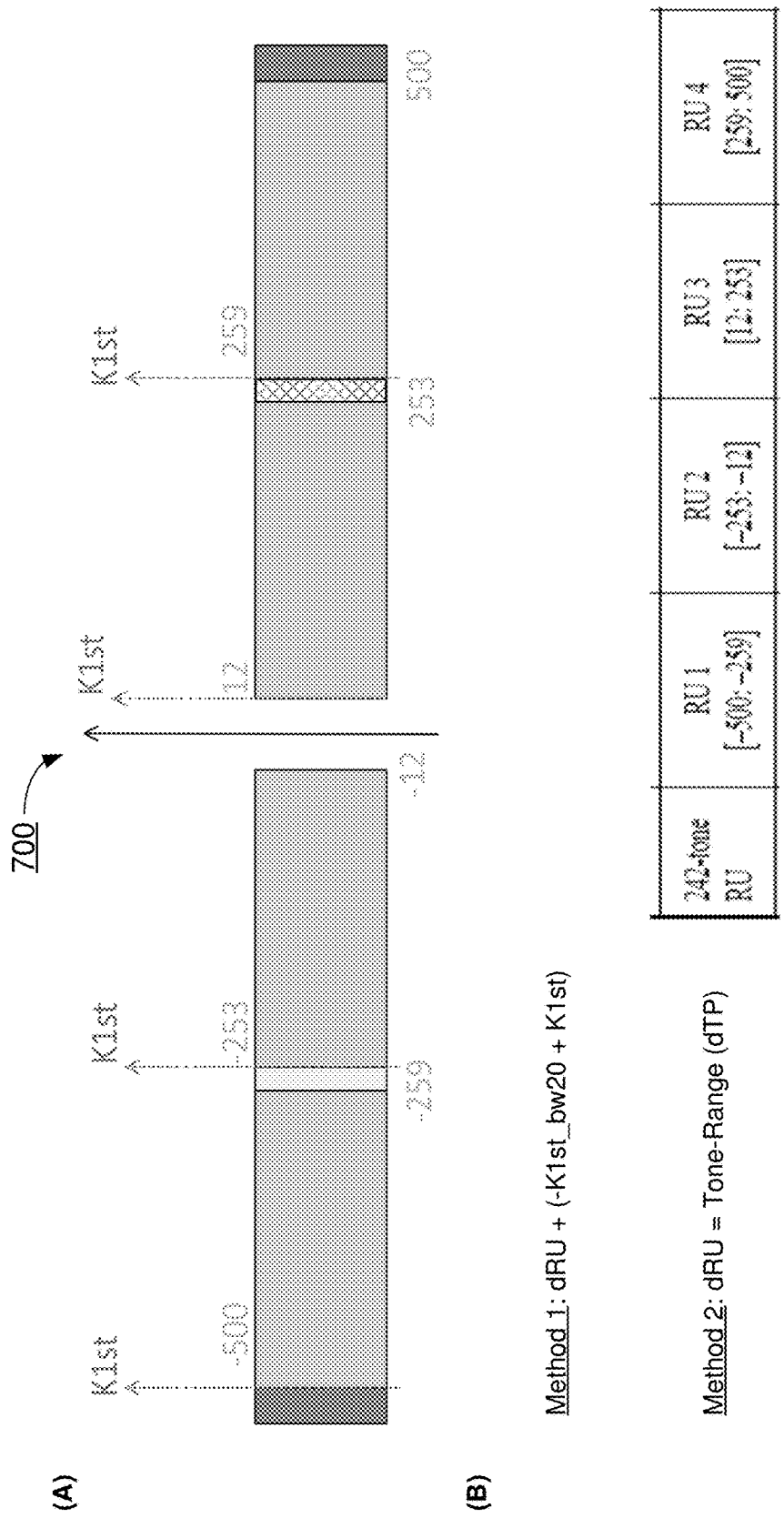
FIG. 7 is a diagram of an example design in accordance with an implementation of the present disclosure.

FIG. 7 illustrates an example design 700 of distribution of a dRU on 20 MHz frequency subblocks over BW80 under a first option (Option 1) of a proposed scheme in accordance with the present disclosure. In design 700, as with the dRU design for a 20 MHz frequency subblock on BW40, the same three methods described above may be applied to a dRU on a 20 MHz frequency subblock over BW80, BW160 and BW320. That is, using the first method, distribution or tone indices of the dRU may be expressed as dRU+(−K1st_bw20+K1st), which may be −500 for the first 20 MHz frequency subblock, −253 for the second 20 MHz frequency subblock, 12 for the third 20 MHz frequency subblock, and 259 for the fourth 20 MHz frequency subblock. K1st may be chosen as the first tone index of each RU242 of BW40, BW80, BW160 and BW320. Using the second method, distribution or tone indices of the dRU may be expressed as dRU=Tone-Range (dTP), where Tone-Range may be [−500:−259] for the first 20 MHz frequency subblock, [−253:−12] for the second 20 MHz frequency subblock, [12:253] for the third 20 MHz frequency subblock, and [259:500] for the fourth 20 MHz frequency subblock. Tone-Range may be chosen as each RU242 tone range. Using the third method, distribution or tone indices of the dRU may be expressed as $k=K1st+k_{td}$.

FIG. 8 illustrates an example design 800 of distribution of a dRU on 20 MHz frequency subblocks over BW160 and BW320 under a proposed scheme in accordance with the present disclosure. Part (A) of FIG. 8 shows an example distribution of a dRU on a 20 MHz frequency subblock over BW160. Part (B) of FIG. 8 shows an example distribution of a dRU on a 20 MHz frequency subblock over BW320. In design 800, as with the dRU design for a 20 MHz frequency subblock on BW40, the same three methods described above may be applied to a dRU on a 20 MHz frequency subblock over BW160 and BW320.

Under the proposed scheme, with respect to distribution of a dRU on a 20 MHz frequency subblock over BW160, K1st=−1012 or Tone-Range=RU1 for the first 20 MHz frequency subblock; K1st=−765 or Tone-Range=RU2 for the second 20 MHz frequency subblock; K1st=−500 or Tone-Range=RU3 for the third 20 MHz frequency subblock; K1st=−253 or Tone-Range=RU4 for the fourth 20 MHz frequency subblock; K1st=12 or Tone-Range=RU5 for the fifth 20 MHz frequency subblock; K1st=259 or Tone-Range=RU6 for the sixth 20 MHz frequency subblock; K1st=524 or Tone-Range=RU7 for the seventh 20 MHz frequency subblock; and K1st=771 or Tone-Range=RU8 for the eighth 20 MHz frequency subblock. Similarly, with respect to distribution of a dRU on a 20 MHz frequency subblock over BW320, K1st=−2036 or Tone-Range=RU1 for the first 20 MHz frequency subblock; K1st=−1789 or Tone-Range=RU2 for the second 20 MHz frequency subblock; K1st=−1524 or Tone-Range=RU3 for the third 20 MHz frequency subblock; K1st=−1277 or Tone-Range=RU4 for the fourth 20 MHz frequency subblock; K1st=−1012 or Tone-Range=RU5 for the fifth 20 MHz frequency subblock; K1st=−765 or Tone-Range=RU6 for the sixth 20 MHz frequency subblock; K1st=−500 or Tone-Range=RU7 for the seventh 20 MHz frequency subblock; K1st=−253 or Tone-Range=RU8 for the eighth 20 MHz frequency subblock; K1st=12 or Tone-Range=RU9 for the ninth 20 MHz frequency subblock; K1st=259 or Tone-Range=RU10 for the tenth 20 MHz frequency subblock; K1st=524 or Tone-Range=RU11 for the eleventh 20 MHz frequency subblock; K1st=771 or Tone-Range=RU12 for the twelfth 20 MHz frequency subblock; K1st=1036 or Tone-Range=RU13 for the thirteenth 20 MHz frequency subblock; K1st=1283 or Tone-Range=RU14 for the fourteenth 20 MHz frequency subblock; K1st=1548 or Tone-Range=RU15 for the fifteenth 20 MHz frequency subblock; and K1st=1795 or Tone-Range=RU16 for the sixteenth 20 MHz frequency subblock.

Figure 9:
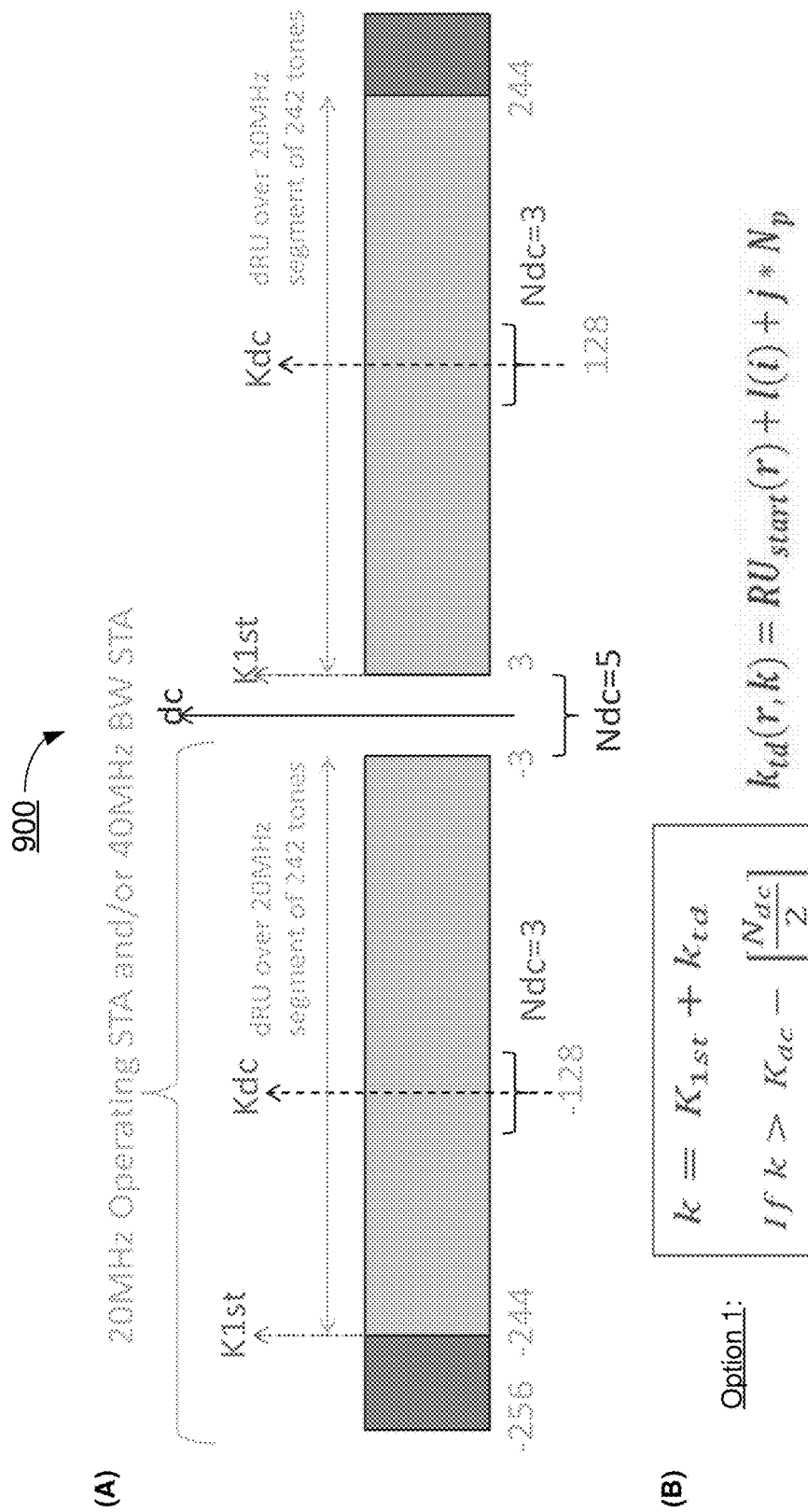
FIG. 9 is a diagram of an example design in accordance with an implementation of the present disclosure.

FIG. 9 illustrates an example design 900 of distribution of a dRU on 20 MHz frequency subblocks over BW40 under a second option (Option 2) of a proposed scheme in accordance with the present disclosure. In design 900, a parameter K1st may be defined as a first left-hand side tone of one frequency segment/subblock. For instance, as shown in part (A) of FIG. 6, K1st=−244 for the first 20 MHz frequency subblock of the 40 MHz bandwidth, and K1st=3 for the second 20 MHz frequency subblock of the 40 MHz bandwidth. Moreover, under Option 2, a minimum number of DC tones, Ndc, (e.g., Ndc>=3 DC tones) may be reserved around the middle of each 20 MHz frequency subblock, denoted as Kdc.

Using a first method under Option 2 of the proposed scheme, distribution or tone indices of the dRU may be expressed as $k=K1st+k_{td}$, with $k_{td}$ being a tone distribution pattern of the dRU that is generated as described above with respect to design 200. Using a second method under Option 2 of the proposed scheme, distribution or tone indices of the dRU may be expressed as dRU=Tone-Range (dTP). For instance, Tone-Range=[−244:−130, −126:−3] for the first (or lower) 20 MHz frequency subblock, and Tone-Range=[3: 126, 130:244] for the second (or upper) 20 MHz frequency subblock.

Figure 10:
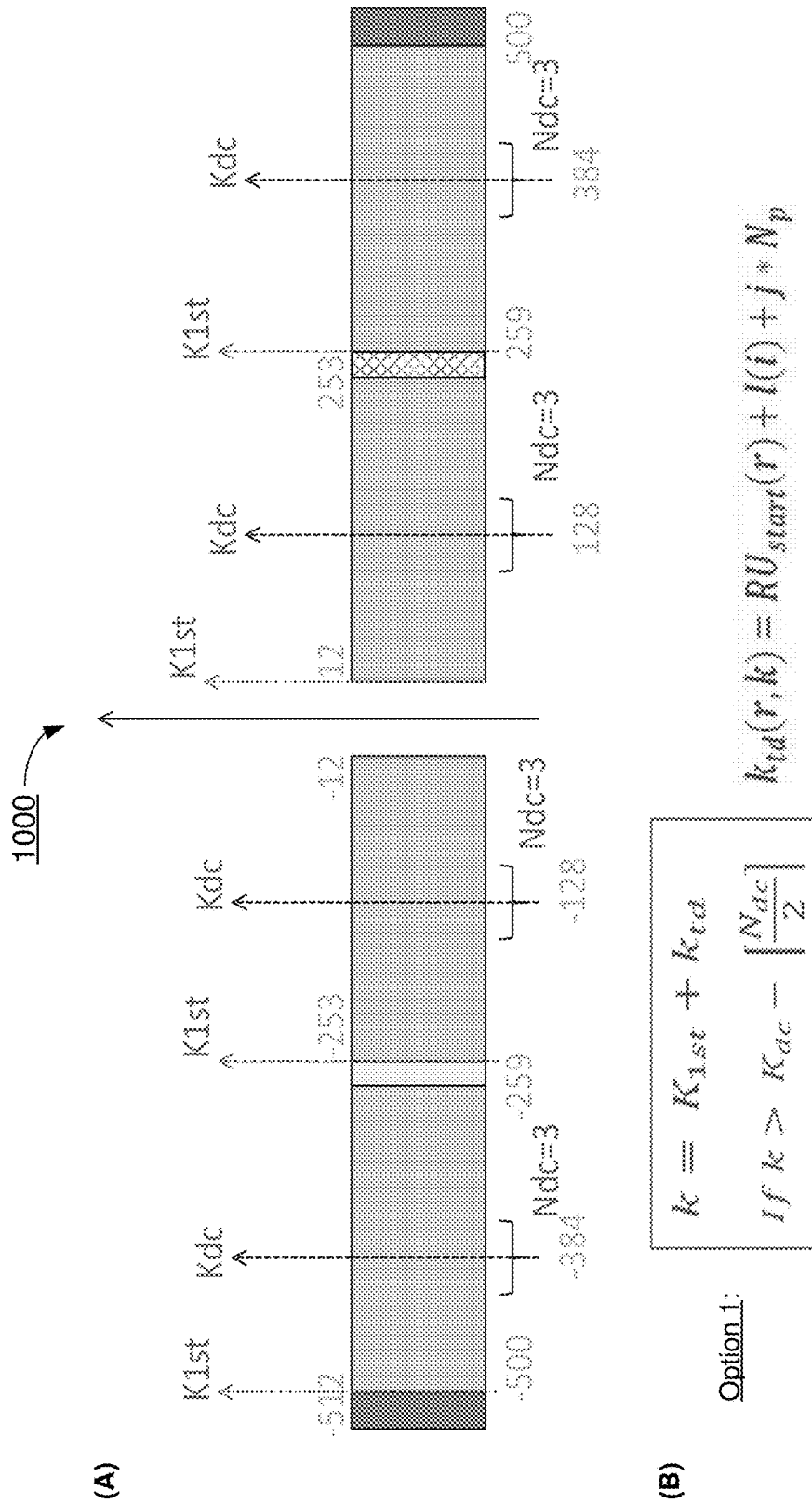
FIG. 10 is a diagram of an example design in accordance with an implementation of the present disclosure.
Figure 11:
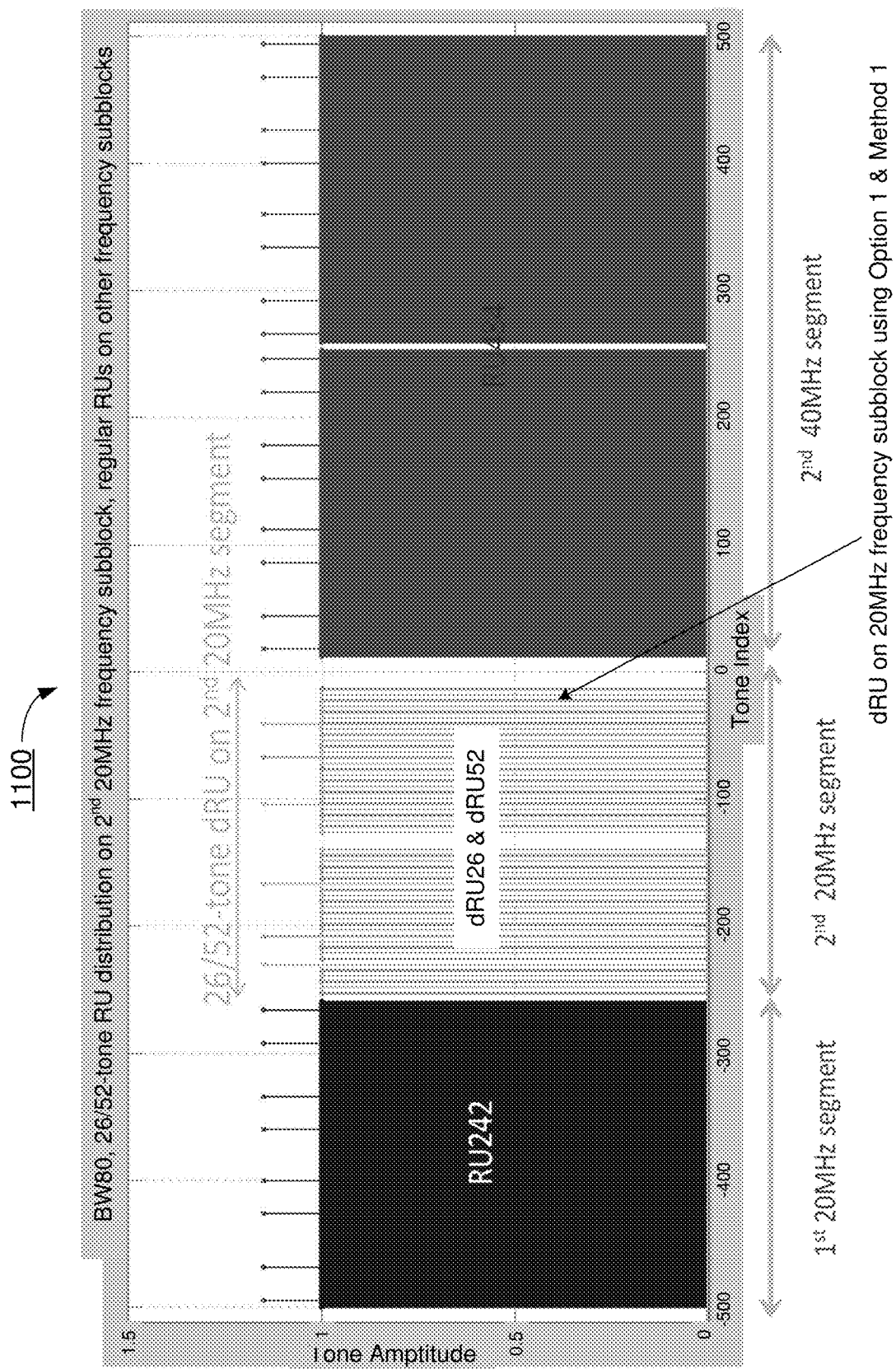
FIG. 11 is a diagram of an example scenario in accordance with an implementation of the present disclosure.

FIG. 10 illustrates an example design 1000 of distribution of a dRU on 20 MHz frequency subblocks over BW80 under a second option (Option 2) of a proposed scheme in accordance with the present disclosure. In design 1000, as with the dRU design for a 20 MHz frequency subblock on BW40, the same two methods described above may be applied to a dRU on a 20 MHz frequency subblock over BW80, BW160 and BW320. That is, using the first method, distribution or tone indices of the dRU may be expressed as $k=K1st+k_{td}$. It is noteworthy that, for the second and third 20 MHz frequency subblocks in BW80, the K1st and Kdc may be moved several tones toward the center of distribution of the tones of BW80. Using the second method, distribution or tone indices of the dRU may be expressed as dRU=Tone-Range (dTP), where Tone-Range may be [−500:−386,−382:−259] for the first 20 MHz frequency subblock, [−253:−130, −126:−12] for the second 20 MHz frequency subblock, and so on. FIG. 11 illustrates an example scenario 1100 of distribution of a dRU on one 20 MHz frequency subblock of BW80 using the first method under Option 1.

Figure 12:
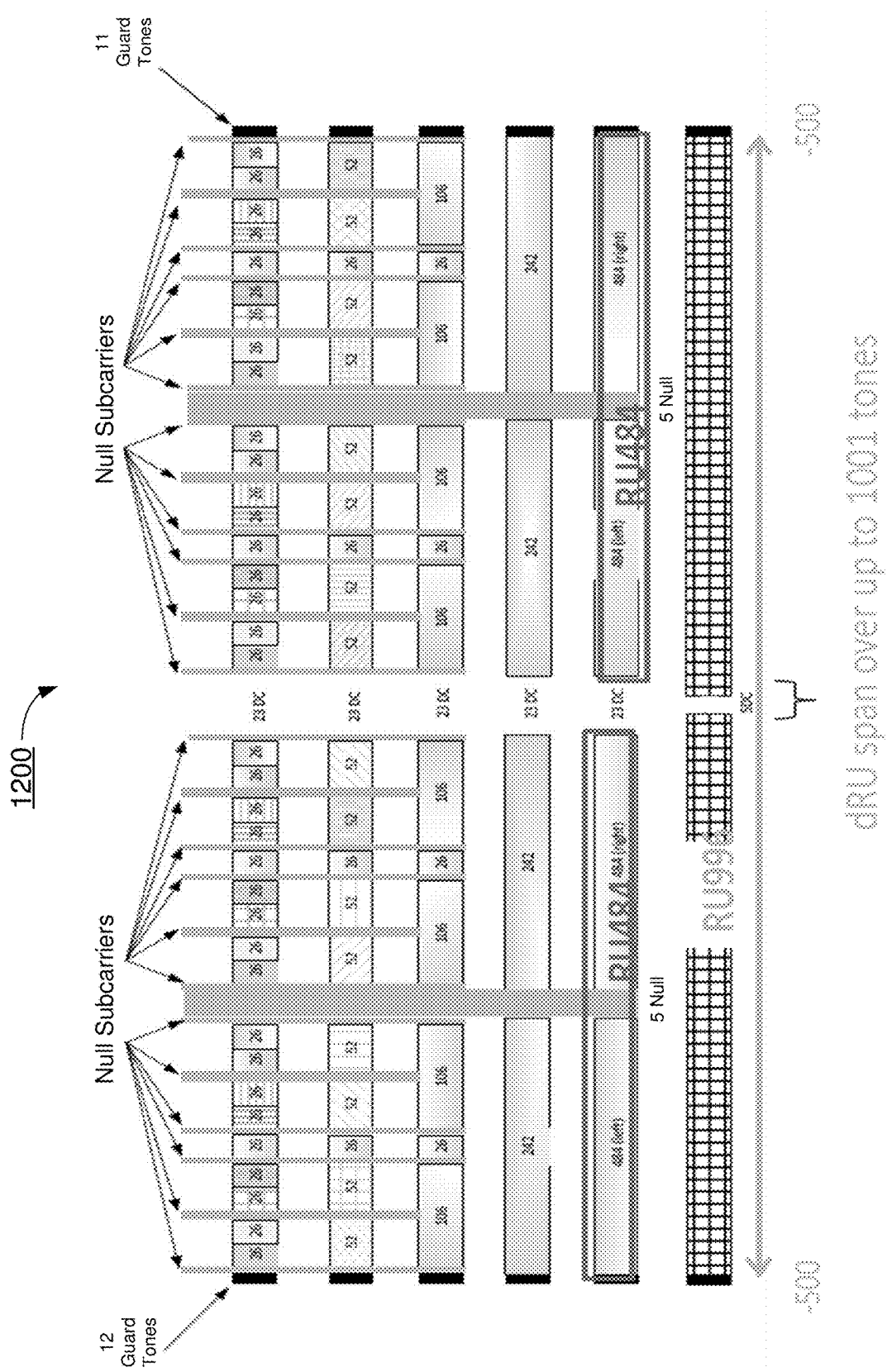
FIG. 12 is a diagram of an example design in accordance with an implementation of the present disclosure.

FIG. 12 illustrates an example design 1200 of distribution of a dRU on BW80 under a proposed scheme in accordance with the present disclosure. Referring to FIG. 12, tones of the dRU may be distributed over a tone range of RU996 (e.g., over [−500:−3, 3:500]. In design 1200, at least five DC tones may be kept around the middle of tone distribution of each dRU. Depending on the tone-alignment method, tones of the dRU may be distributed toward the center, thereby leaving more edge tones on each side (in particular, for smaller RU), or distributed with tones aligned with edge(s), thereby leaving more DC tones in the center of tone distribution.

FIG. 13A and FIG. 13B each illustrates a respective portion of an example design 1300 showing dRU indices (Np=37) on BW80 under a proposed scheme in accordance with the present disclosure. Specifically, FIG. 13A shows dRU indices and subcarrier range for 26-tone dRUs, and FIG. 13B shows dRU indices and subcarrier range for 52-tone, 106-tone, 242-tone and 484-tone dRUs. It is noteworthy that tones of the dRU may be distributed according to different tone-alignment schemes such as, for example and without limitation, edge-aligned and DC-symmetric, edge-aligned and DC-asymmetric, center-aligned and DC-symmetric, or center-aligned and DC-asymmetric.

Figure 14:
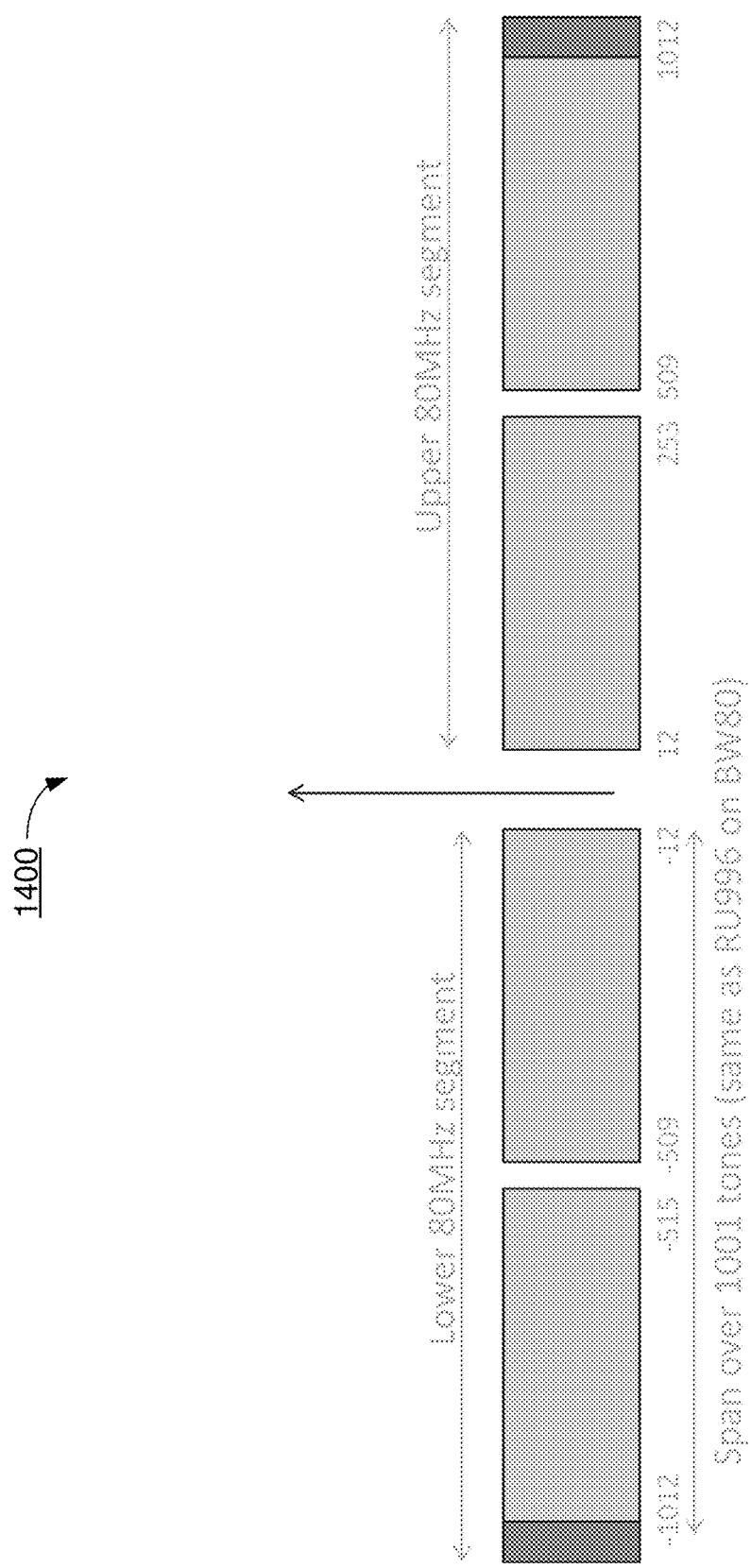
FIG. 14 is a diagram of an example design in accordance with an implementation of the present disclosure.
Figure 15:
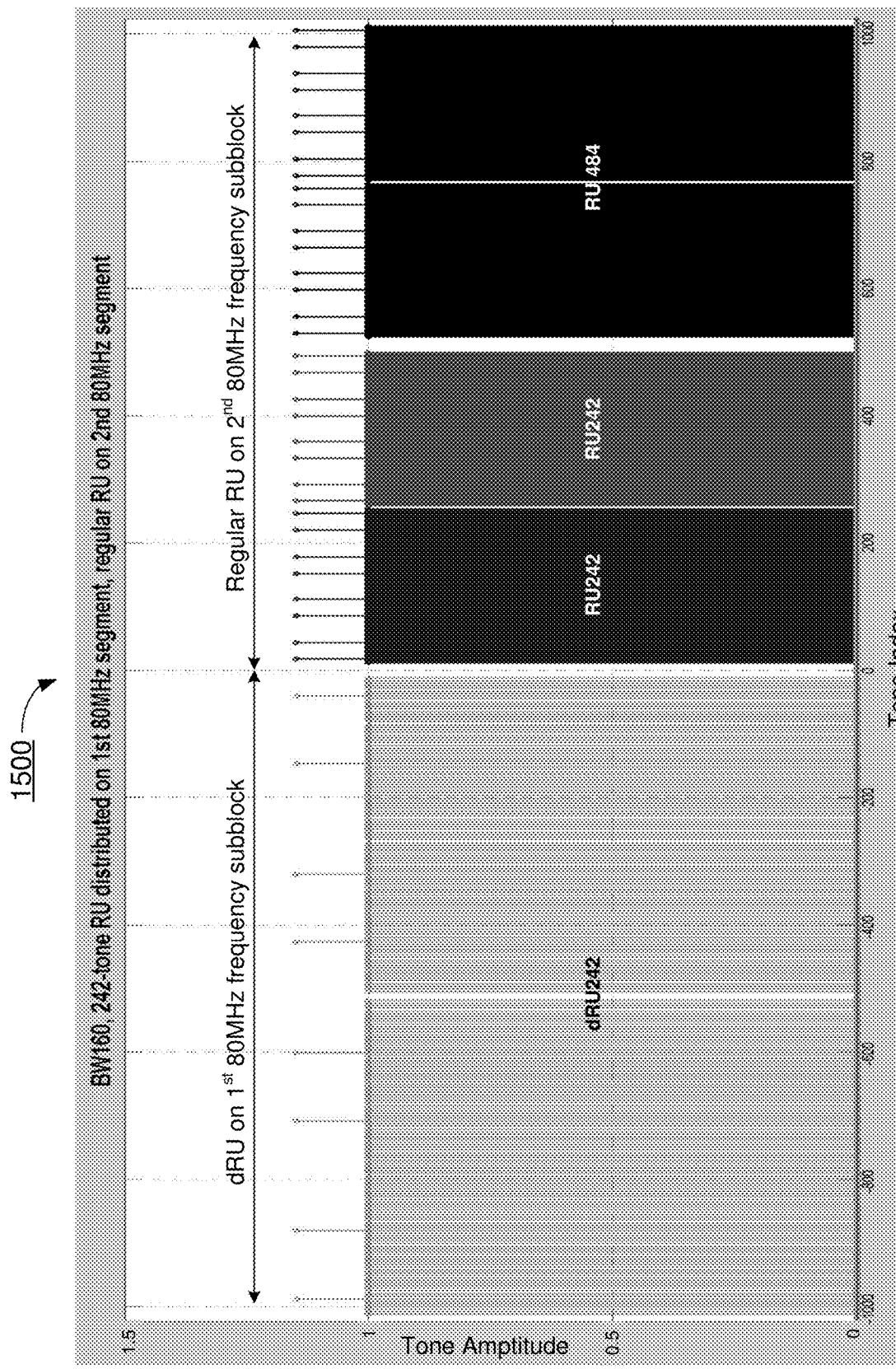
FIG. 15 is a diagram of an example scenario in accordance with an implementation of the present disclosure.

FIG. 14 illustrates an example design 1400 of distribution of a dRU on an 80 MHz frequency subblock of BW160. In design 1400, distribution of the dRU on one 80 MHz frequency subblock of BW160 or BW320 may be achieved by a constant shift from the dRU on BW80, such as "dRU+$K_{shift}$", where $K_{shift}$ may be an integer value defined for each 80 MHz frequency subblock and dRU may denote the distributed RU subcarrier indices. The same tone distribution pattern on any 80 MHz frequency subblock may be maintained to be the same as dRU on BW80. Moreover, positions and numbers of DC tones may be preserved or maintained as those for dRU on BW80 for each 80 MHz frequency subblock. For instance, in design 1400, distribution of the dRU on the first 80 MHz frequency subblock of BW160 may be dRU+500-1012 (e.g., in case that dRU is edge-aligned) or dRU−512 (e.g., dRU−Nfft/2 for Nfft=1024 at 80 MHz). Similarly, distribution of the dRU on the second 80 MHz frequency subblock of BW160 may be dRU+500+12 (e.g., in case that dRU is edge-aligned) or dRU+512 (e.g., dRU+Nfft/2 for Nfft=1024 at 80 MHz). Here, dRU denotes the distributed-tone RU subcarrier indices on BW80. FIG. 15 illustrates an example scenario 1500 of distribution of a dRU on one 20 MHz frequency subblock of BW80 using the first method under Option 1.

Figure 16:
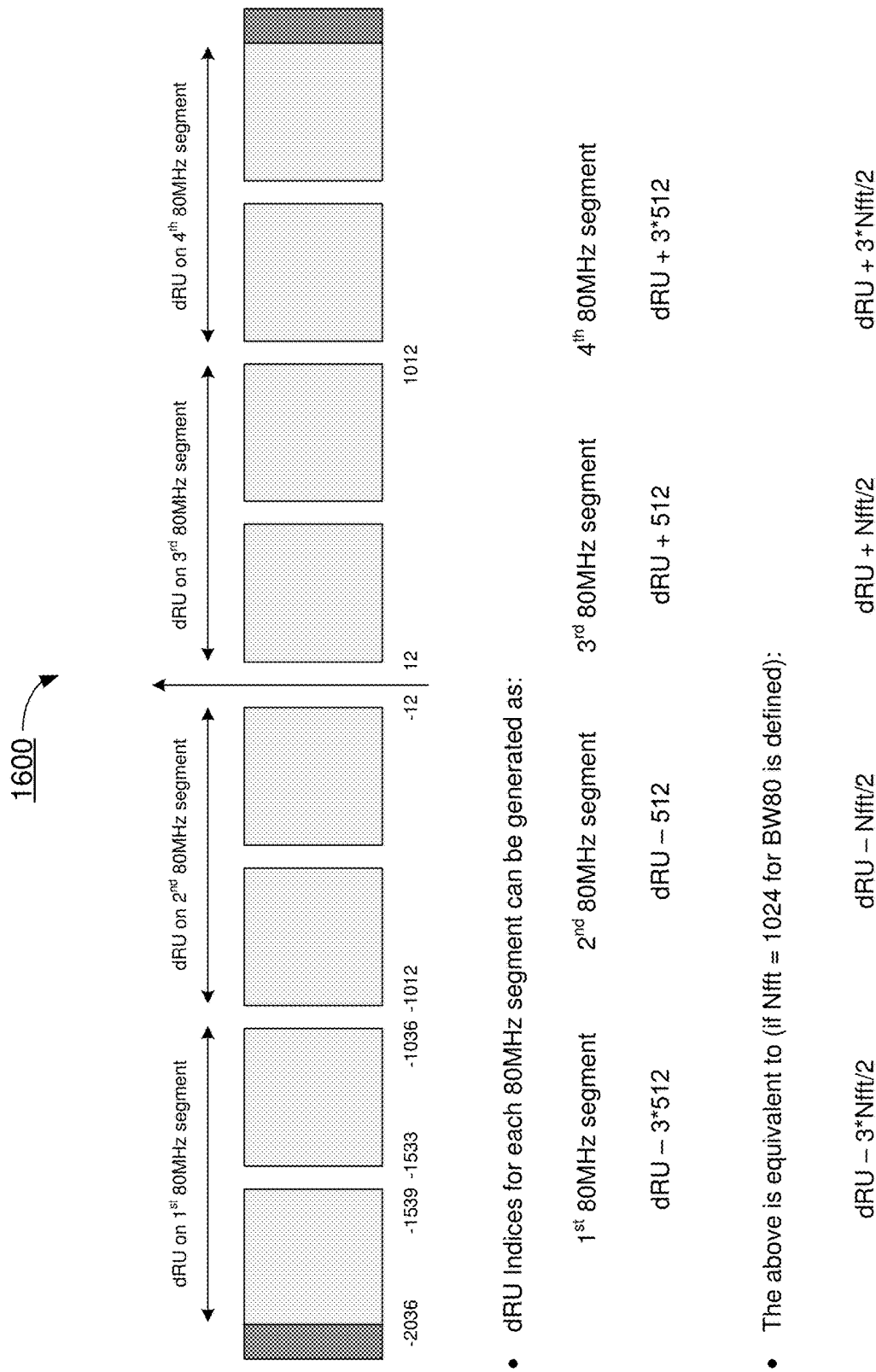
FIG. 16 is a diagram of an example design in accordance with an implementation of the present disclosure.

FIG. 16 illustrates an example design 1600 of distribution of a dRU on an 80 MHz frequency subblock of BW320. In design 1600, distribution of the dRU on one 80 MHz frequency subblock of BW160 or BW320 may be achieved by a constant shift from the dRU on BW80, such as "dRU+$K_{shift}$", where $K_{shift}$ may be an integer value defined for each 80 MHz frequency subblock and dRU may denote the distributed RU subcarrier indices. The same tone distribution pattern on any 80 MHz frequency subblock may be maintained to be the same as dRU on BW80. For instance, in design 1600, dRU indices for each 80 MHz frequency subblock may be generated as follows: dRU−3*512 for the first 80 MHz frequency subblock, dRU−512 for the second 80 MHz frequency subblock, dRU+512 for the third 80 MHz frequency subblock, and dRU+3*512 for the fourth 80 MHz frequency subblock. In an event that Nfft=1024 for BW80 is defined, equivalent dRU indices may be as follows: dRU−3*Nfft/2 for the first 80 MHz frequency subblock, dRU−Nfft/2 for the second 80 MHz frequency subblock, dRU+Nfft/2 for the third 80 MHz frequency subblock, and dRU+3*Nfft/2 for the fourth 80 MHz frequency subblock. Here, dRU denotes the distributed-tone RU subcarrier indices on BW80.

Figure 17:
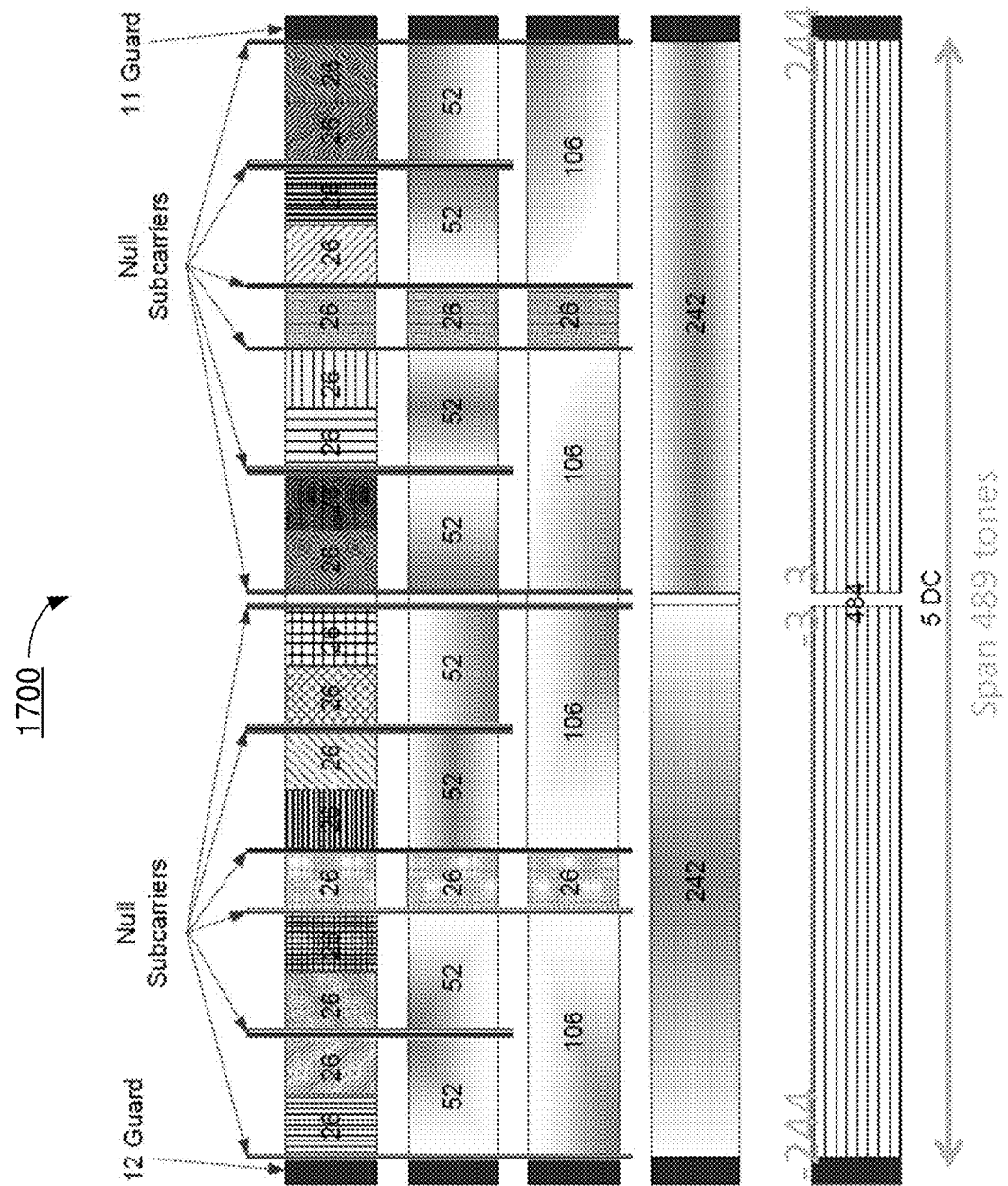
FIG. 17 is a diagram of an example design in accordance with an implementation of the present disclosure.
Figure 18:
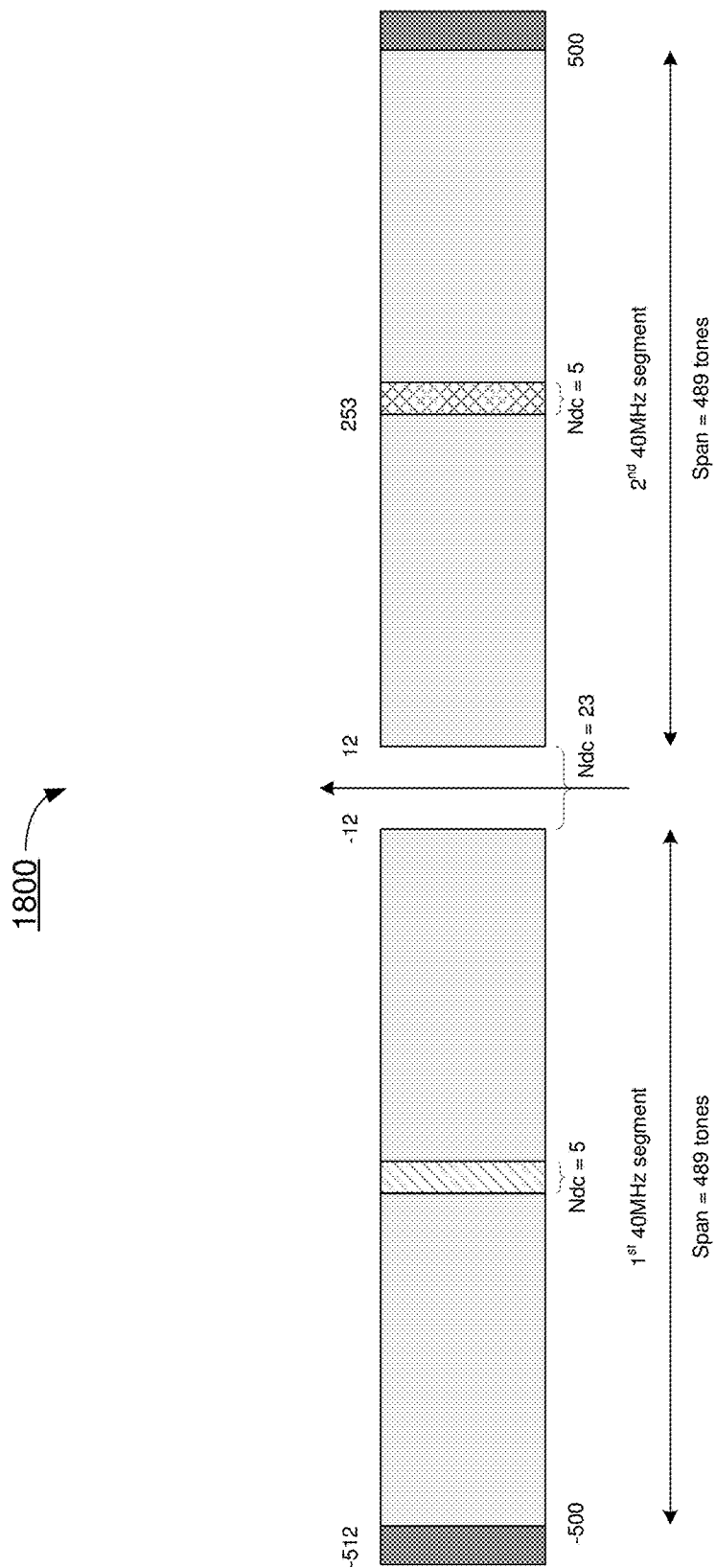
FIG. 18 is a diagram of an example design in accordance with an implementation of the present disclosure.

FIG. 17 illustrates an example design 1700 of distribution of a dRU on BW40. FIG. 18 illustrates an example design 1800 of distribution of a dRU on a 40 MHz frequency subblock of BW80. In design 1800, distribution of the dRU on one 40 MHz frequency subblock of BW160 or BW320 may be achieved by a constant shift from the dRU on BW40, such as "dRU+$K_{shift}$", where $K_{shift}$ may be an integer value defined for each 40 MHz frequency subblock and dRU may denote the distributed RU subcarrier indices. The same tone distribution pattern on any 40 MHz frequency subblock may be maintained to be the same as dRU on BW40. Moreover, positions and numbers of DC tones may be preserved or maintained as those for dRU on BW40 for each 40 MHz frequency subblock. For instance, in design 1800, distribution of the dRU on the first 40 MHz frequency subblock of BW80 may be dRU+244-500 (e.g., in case that dRU is edge-aligned) or dRU−256 (e.g., dRU−Nfft/2 for Nfft=512 at 40 MHz). Similarly, distribution of the dRU on the second 40 MHz frequency subblock of BW80 may be dRU+244+12 (e.g., in case that dRU is edge-aligned) or dRU+256 (e.g., dRU+Nfft/2 for Nfft=512 at 40 MHz). Here, dRU denotes the distributed-tone RU subcarrier indices on BW40.

Figure 19:
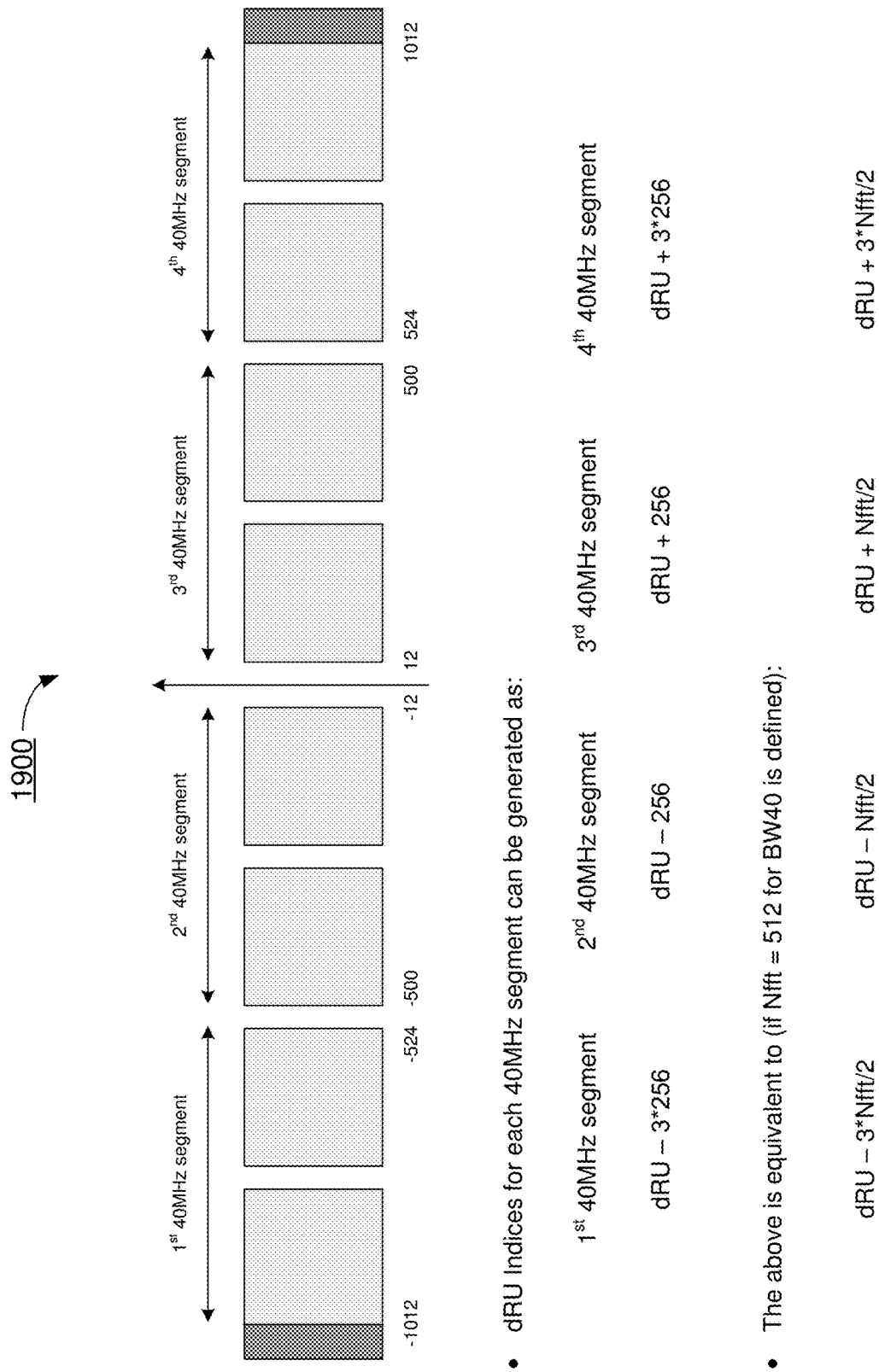
FIG. 19 is a diagram of an example design in accordance with an implementation of the present disclosure.

FIG. 19 illustrates an example design 1900 of distribution of a dRU on an 40 MHz frequency subblock of BW160. In design 1900, distribution of the dRU on one 40 MHz frequency subblock of BW160 or BW320 may be achieved by a constant shift from the dRU on BW40, such as "dRU+$K_{shift}$", where $K_{shift}$ may be an integer value defined for each 40 MHz frequency subblock and dRU may denote the distributed RU subcarrier indices. The same tone distribution pattern on any 40 MHz frequency subblock may be maintained to be the same as dRU on BW40. For instance, in design 1900, dRU indices for each 40 MHz frequency subblock may be generated as follows: dRU−3*256 for the first 40 MHz frequency subblock, dRU−256 for the second 40 MHz frequency subblock, dRU+256 for the third 40 MHz frequency subblock, and dRU+3*256 for the fourth 40 MHz frequency subblock. In an event that Nfft=512 for BW40 is defined, equivalent dRU indices may be as follows: dRU−3*Nfft/2 for the first 40 MHz frequency subblock, dRU−Nfft/2 for the second 40 MHz frequency subblock, dRU+Nfft/2 for the third 40 MHz frequency subblock, and dRU+3*Nfft/2 for the fourth 40 MHz frequency subblock. Here, dRU denotes the distributed-tone RU subcarrier indices on BW40.

In design 1900, for distribution of dRU on a 40 MHz frequency subblock of BW320, there may be total eight 40 MHz frequency subblocks in the BW320, and dRU indices on each 40 MHz frequency subblock may be generated with a constant shift as follows: dRU−7*256 for the first 40 MHz frequency subblock, dRU−5*256 for the second 40 MHz frequency subblock, dRU−3*256 for the third 40 MHz frequency subblock, dRU−256 for the fourth 40 MHz frequency subblock, dRU+256 for the fifth 40 MHz frequency subblock, dRU+3*256 for the sixth 40 MHz frequency subblock, dRU+5*256 for the seventh 40 MHz frequency subblock, and dRU+7*256 for the eighth 40 MHz frequency subblock. In an event that Nfft=512 for BW40 is defined, equivalent dRU indices may be as follows: dRU−7*Nfft/2 for the first 40 MHz frequency subblock, dRU−5*Nfft/2 for the second 40 MHz frequency subblock, dRU−3*Nfft/2 for the third 40 MHz frequency subblock, dRU−Nfft/2 for the fourth 40 MHz frequency subblock, dRU+Nfft/2 for the fifth 40 MHz frequency subblock, dRU+3*Nfft/2 for the sixth 40 MHz frequency subblock, dRU+5*Nfft/2 for the seventh 40 MHz frequency subblock, and dRU+7*Nfft/2 for the eighth 40 MHz frequency subblock. Here, dRU denotes the distributed-tone RU subcarrier indices on BW40.

Figure 20:
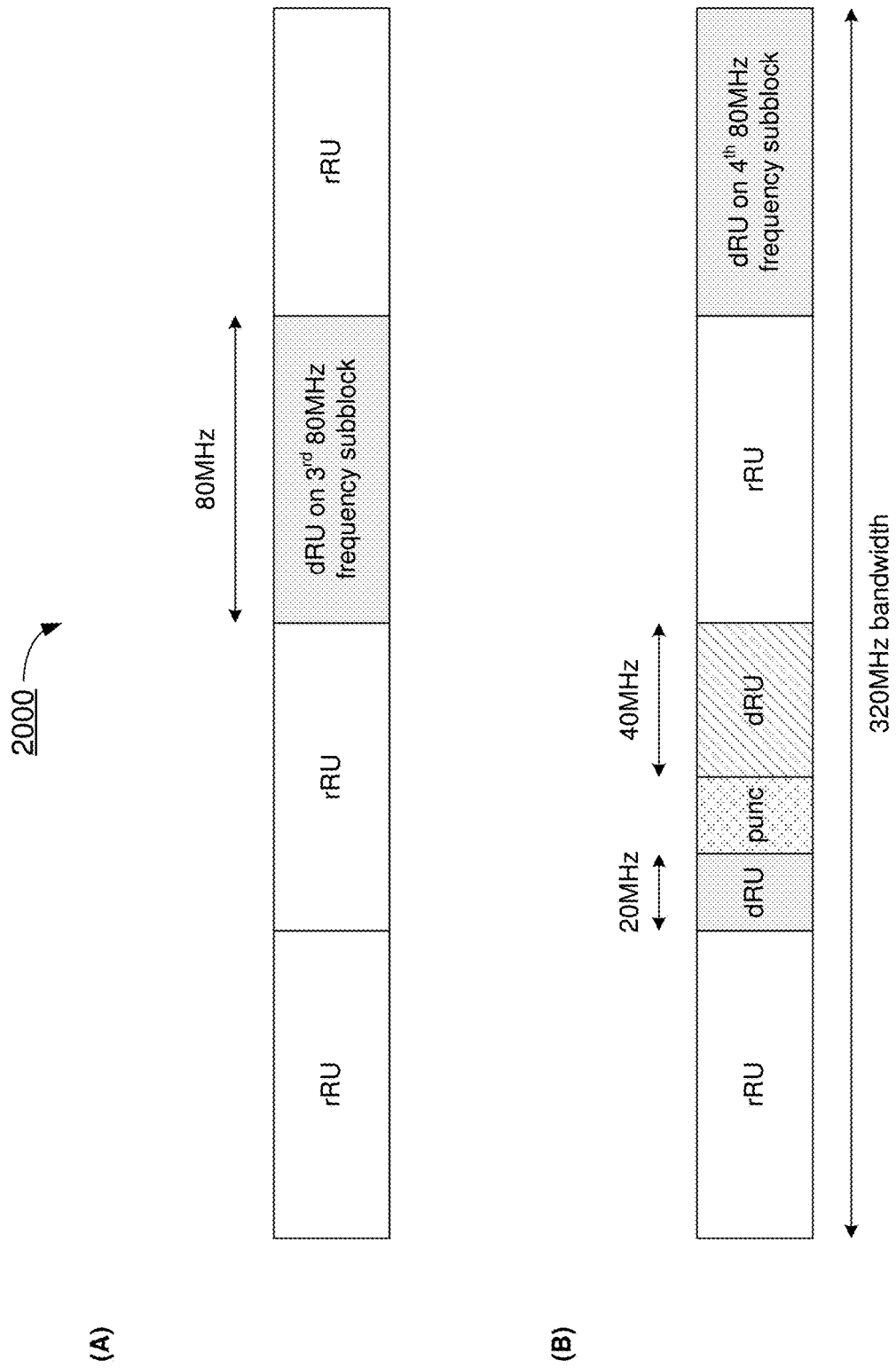
FIG. 20 is a diagram of an example scenario in accordance with an implementation of the present disclosure.

Under various proposed schemes in accordance with the present disclosure, dRUs may be utilized in operations in a hybrid mode and/or a puncture mode. FIG. 20 illustrates an example scenario 2000 in which various proposed schemes may be implemented. Referring to part (A) of FIG. 20, a dRU may be distributed on an 80 MHz frequency subblock for a hybrid-mode operation in BW160 or BW320. As shown in part (A) of FIG. 20, each of the first, second and fourth 80 MHz frequency subblocks of a 320 MHz bandwidth may have a rRU thereon while the third 80 MHz frequency subblock may have tones of a dRU distributed thereon. Referring to part (B) of FIG. 20, a dRU may be distributed on a 20 MHz or 40 MHz frequency subblock for a puncture-mode operation in BW80, BW160 or BW320. As shown in part (B) of FIG. 20, each of the first and third 80 MHz frequency subblocks of a 320 MHz bandwidth may have a rRU thereon while the fourth 80 MHz frequency subblock may have tones of a dRU distributed thereon. Additionally, in the second 80 MHz frequency subblock, a first 20 MHz segment or subblock may have tones of one dRU distributed thereon, a second 20 MHz segment or subblock may be punctured, and a second 40 MHz segment or subblock may have tones of another dRU distributed thereon. Under various proposed schemes in accordance with the present disclosure, dRUs may be distributed on frequency subblocks of a wide-bandwidth PPDU with a constant shift on dRU(s) designed on 20 MHz, 40 MHz and/or 80 MHz bandwidth(s).

Under a proposed scheme in accordance with the present disclosure, a dRU may be distributed on one or more frequency subblocks of a wide bandwidth with a one-step option. Under the proposed scheme, distribution of tones of a dRU of any size onto any frequency subblock (with size of 20 MHz, 40 MHz or 80 MHz) of a wider bandwidth (e.g., 80 MHz, 160 MHz or 320 MHz) may be generated and expressed as follows: $k_{dRU\_i} = k_{dRU} + K_{shift}(i)$. Here, $k_{dRU}$ denotes dRU subcarrier indices from a dRU tone table for a dRU on BW20/40/80; $k_{dRU\_i}$ denotes dRU subcarrier indices on an $i^{th}$ frequency subblock of a wide bandwidth; $K_{shift}(i)$ denotes a constant shift value defined in a table shown in FIG. 21; and i denotes a frequency subblock index of a subblock size of 20/40/80 MHz on BW80/160/320. It is noteworthy that $K_{shift}(i)$ may be 120+K1st for subblock size 20 MHz, 244+K1st for subblock size 40 MHz, and 500+K1st for subblock size 80 MHz, with K1st denoting the starting tone index of a corresponding frequency subblock i of subblock size 20 MHz, 40 MHz or 80 MHz.

Figure 21:
FIG. 21 is a diagram of an example design in accordance with an implementation of the present disclosure.

FIG. 21 illustrates an example design 2100 of a table of values of the constant shift $K_{shift}$ under a proposed scheme in accordance with the present disclosure. Referring to FIG. 21, different values of the constant shift $K_{shift}$ are shown for frequency subblock sizes 20 MHz, 40 MHz and 80 MHz and for wide bandwidths 80 MHz, 160 MHz and 320 MHz.

Figure 22:
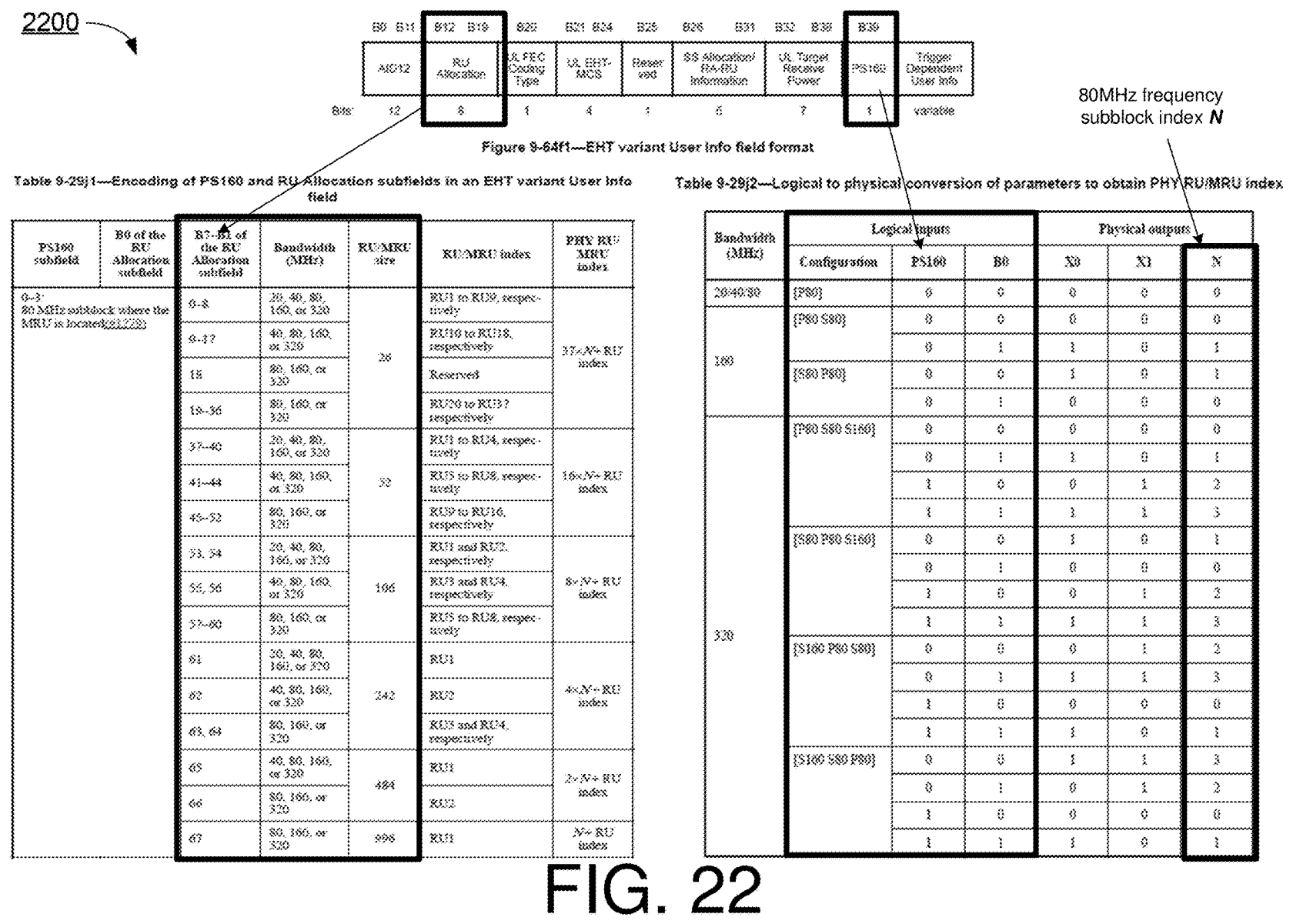

FIG. 22 and FIG. 23 illustrate example designs 2200 and 2300 of frequency subblock indices under a proposed scheme in accordance with the present disclosure. Referring to the table in FIG. 22, in a User Info field of an IEEE 802.11be trigger frame, bits B7-B1 of the RU Allocation subfield may define the RU size and location in 80 MHz. Additionally, the bit of PS160 and B0 of RU Allocation may together define the 80 MHz frequency subblock index N for BW80/160/320. It may be relatively easy to convert or otherwise map bits B7-B1 of the RU Allocation subfield to a 20 MHz or 40 MHz frequency subblock index as defined in the table shown in FIG. 23.

Figure 24:
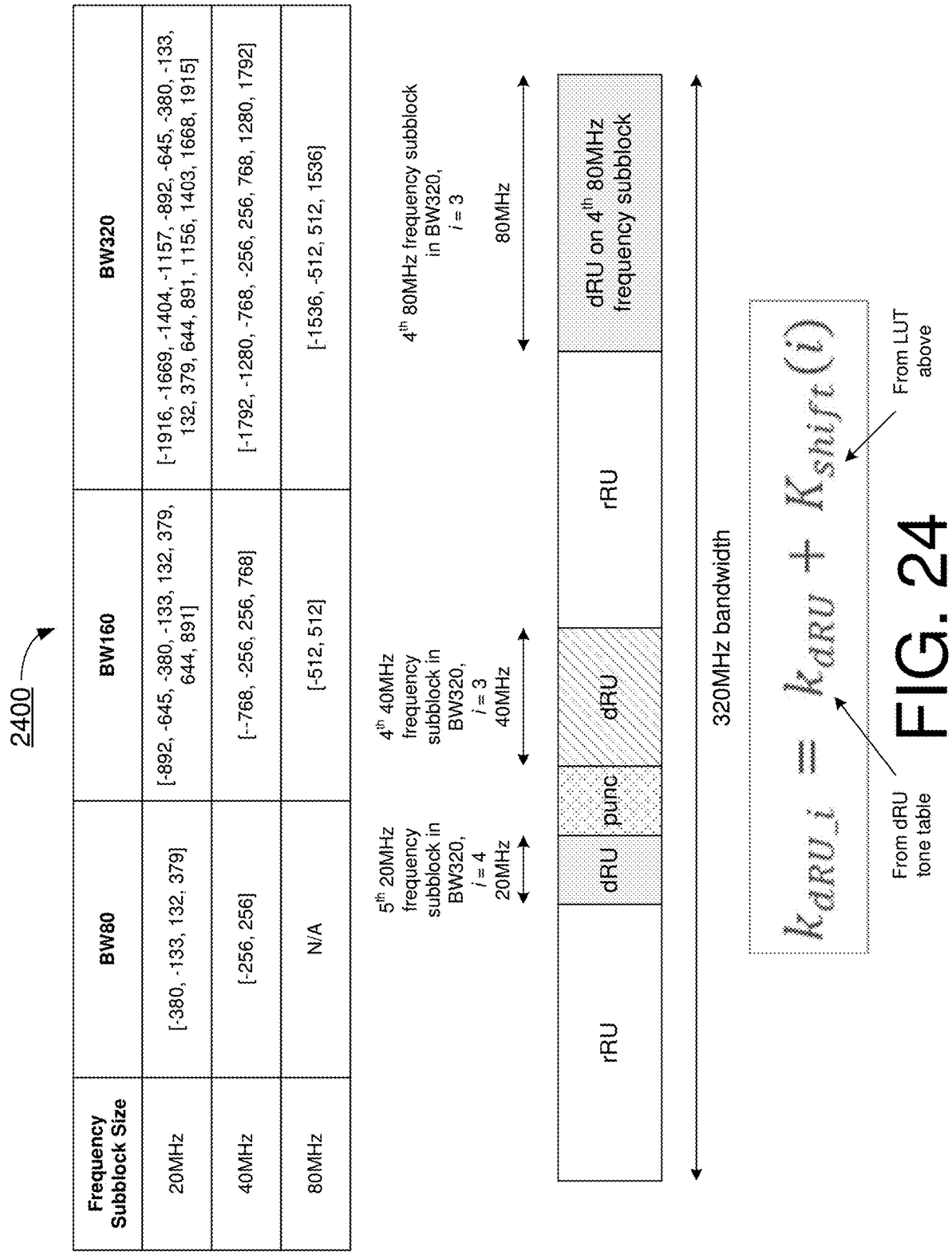
FIG. 24 is a diagram of an example scenario in accordance with an implementation of the present disclosure.

Referring to the table in part (A) of FIG. 23, according to bits B7-B1 of the RU Allocation subfield, the 20 MHz or 40 MHz subblock index M inside an 80 MHz bandwidth may be defined. Moreover, a global subblock index i in BW80/160/320 may be calculated or otherwise determined as shown in part (B) of FIG. 23. It may be assumed that index M, N start from 0. FIG. 24 illustrates an example scenario 2400 of distribution of a dRU on one or more frequency subblocks in BW320 using the one-step option described above. In scenario 2400, the value of $k_{dRU}$ may be determined from the dRU tone table, and the value of $K_{shift}(i)$ may be determined from the lookup table (LUT) shown in FIG. 24.

Figure 26:
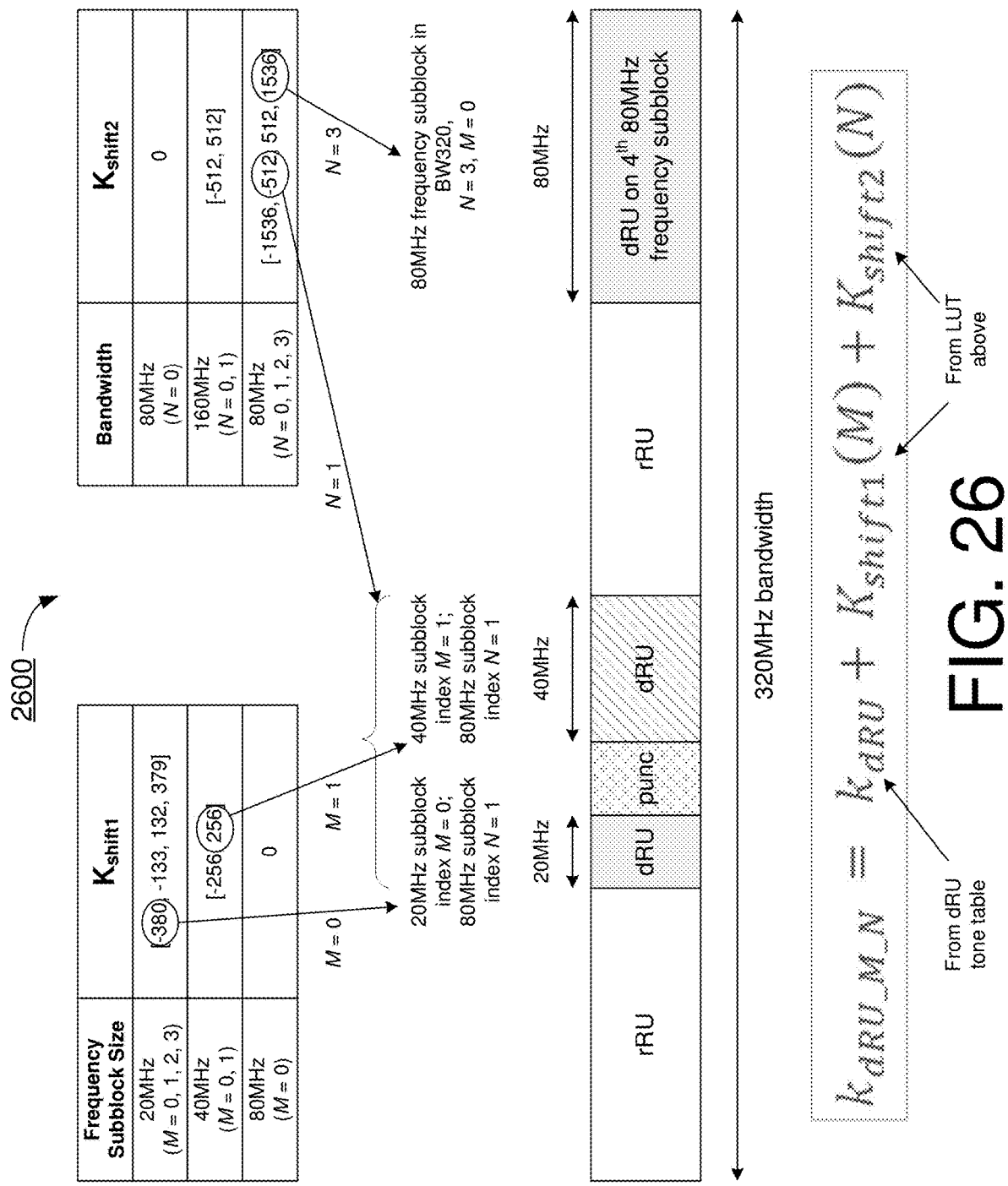
FIG. 26 is a diagram of an example scenario in accordance with an implementation of the present disclosure.

Under another proposed scheme in accordance with the present disclosure, a dRU may be distributed on one or more frequency subblocks of a wide bandwidth with a two-step option. Under the proposed scheme, distribution of tones of a dRU of any size onto any frequency subblock (with size of 20 MHz, 40 MHz or 80 MHz) of a wider bandwidth (e.g., 80 MHz, 160 MHz or 320 MHz) may be generated by splitting the constant shift $K_{shift}$ into two parts as follows: $K_{shift} = K_{shift1} + K_{shift2}$. Here, $K_{shift1}$ corresponds to a shift value for a 20 MHz, 40 MHz or 80 MHz frequency subblock inside BW80, and $K_{shift2}$ corresponds to a shift value for an 80 MHz frequency subblock inside BW80/160/320. FIG. 25 illustrates an example design 2500 under the proposed scheme. Referring to FIG. 25, a general formula for dRU distribution on one or more frequency subblocks over a wider bandwidth is shown, along with tables of values for $K_{shift1}$ and $K_{shift2}$. FIG. 26 illustrates an example scenario 2600 of distribution of a dRU on one or more frequency subblocks in BW320 using the two-step option described above. In scenario 2600, the value of $k_{dRU}$ may be determined from the dRU tone table, and the values of $K_{shift1}$ and $K_{shift2}$ may be determined from the LUT shown in FIG. 26.

In view of the above, FIG. 27, FIG. 28 and FIG. 29 illustrate example designs 2700, 2800 and 2900 of distribution of dRUs on frequency subblocks over a wide-bandwidth PPDU. Design 2700 pertains to distribution of dRUs on frequency subblocks over a 20 MHz PPDU. Design 2800 pertains to distribution of dRUs on frequency subblocks over a 40 MHz PPDU. Design 2900 pertains to distribution of dRUs on frequency subblocks over an 80 MHz PPDU.

Illustrative Implementations

FIG. 30 illustrates an example system 3000 having at least an example apparatus 3010 and an example apparatus 3020 in accordance with an implementation of the present disclosure. Each of apparatus 3010 and apparatus 3020 may perform various functions to implement schemes, techniques, processes and methods described herein pertaining to subcarrier indices for distributed-tone RUs (dRU) in 6 GHz LPI systems, including the various schemes described above with respect to various proposed designs, concepts, schemes, systems and methods described above as well as processes described below. For instance, apparatus 3010 may be an example implementation of communication entity 110, and apparatus 3020 may be an example implementation of communication entity 120.

Each of apparatus 3010 and apparatus 3020 may be a part of an electronic apparatus, which may be a STA or an AP, such as a portable or mobile apparatus, a wearable apparatus, a wireless communication apparatus or a computing apparatus. For instance, each of apparatus 3010 and apparatus 3020 may be implemented in a smartphone, a smart watch, a personal digital assistant, a digital camera, or a computing equipment such as a tablet computer, a laptop computer or a notebook computer. Each of apparatus 3010 and apparatus 3020 may also be a part of a machine type apparatus, which may be an IoT apparatus such as an immobile or a stationary apparatus, a home apparatus, a wire communication apparatus or a computing apparatus. For instance, each of apparatus 3010 and apparatus 3020 may be implemented in a smart thermostat, a smart fridge, a smart door lock, a wireless speaker or a home control center. When implemented in or as a network apparatus, apparatus 3010 and/or apparatus 3020 may be implemented in a network node, such as an AP in a WLAN.

In some implementations, each of apparatus 3010 and apparatus 3020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 3010 and apparatus 3020 may be implemented in or as a STA or an AP. Each of apparatus 3010 and apparatus 3020 may include at least some of those components shown in FIG. 30 such as a processor 3012 and a processor 3022, respectively, for example. Each of apparatus 3010 and apparatus 3020 may further include one or more other components not pertinent to the proposed scheme of the present disclosure (e.g., internal power supply, display device and/or user interface device), and, thus, such component(s) of apparatus 3010 and apparatus 3020 are neither shown in FIG. 30 nor described below in the interest of simplicity and brevity.

In one aspect, each of processor 3012 and processor 3022 may be implemented in the form of one or more single-core processors, one or more multi-core processors, one or more RISC processors or one or more CISC processors. That is, even though a singular term "a processor" is used herein to refer to processor 3012 and processor 3022, each of processor 3012 and processor 3022 may include multiple processors in some implementations and a single processor in other implementations in accordance with the present disclosure. In another aspect, each of processor 3012 and processor 3022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 3012 and processor 3022 is a special-purpose machine specifically designed, arranged and configured to perform specific tasks including those pertaining to designs of a dRU on a frequency subblock of a wide-bandwidth PPDU in 6 GHz LPI systems in accordance with various implementations of the present disclosure. For instance, each of processor 3012 and processor 3022 may be configured with hardware components, or circuitry, implementing one, some or all of the examples described and illustrated herein.

In some implementations, apparatus 3010 may also include a transceiver 3016 coupled to processor 3012. Transceiver 3016 may be capable of wirelessly transmitting and receiving data. In some implementations, apparatus 3020 may also include a transceiver 3026 coupled to processor 3022. Transceiver 3026 may include a transceiver capable of wirelessly transmitting and receiving data.

In some implementations, apparatus 3010 may further include a memory 3014 coupled to processor 3012 and capable of being accessed by processor 3012 and storing data therein. In some implementations, apparatus 3020 may further include a memory 3024 coupled to processor 3022 and capable of being accessed by processor 3022 and storing data therein. Each of memory 3014 and memory 3024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 3014 and memory 3024 may include a type of read-only memory (ROM) such as mask ROM, programmable ROM (PROM), erasable programmable ROM (EPROM) and/or electrically erasable programmable ROM (EEPROM). Alternatively, or additionally, each of memory 3014 and memory 3024 may include a type of non-volatile random-access memory (NVRAM) such as flash memory, solid-state memory, ferroelectric RAM (FeRAM), magnetoresistive RAM (MRAM) and/or phase-change memory.

Each of apparatus 3010 and apparatus 3020 may be a communication entity capable of communicating with each other using various proposed schemes in accordance with the present disclosure. For illustrative purposes and without limitation, a description of capabilities of apparatus 3010, as communication entity 110, and apparatus 3020, as communication entity 120, is provided below. It is noteworthy that, although the example implementations described below are provided in the context of WLAN, the same may be implemented in other types of networks. Thus, although the following description of example implementations pertains to a scenario in which apparatus 3010 functions as a transmitting device and apparatus 3020 functions as a receiving device, the same is also applicable to another scenario in which apparatus 3010 functions as a receiving device and apparatus 3020 functions as a transmitting device.

Under a proposed scheme in accordance with the present disclosure with respect to designs of a dRU on a frequency subblock of a wide-bandwidth PPDU in 6 GHz LPI systems, processor 3012 of apparatus 3010 may generate a PPDU with subcarriers of a RU distributed on a frequency subblock of a plurality of frequency subblocks of a wide bandwidth. Moreover, processor 3012 may transmit, via transceiver 3016, the PPDU (e.g., to apparatus 3020) over the wide bandwidth.

In some implementations, each of the plurality of frequency subblocks may be a 20 MHz, 40 MHz or 80 MHz frequency subblock. Additionally, the wide bandwidth may be an 80 MHz, 160 MHz or 320 MHz bandwidth. Moreover, the subcarriers of the RU may be distributed on the frequency block by applying a constant shift to a dRU on a 20 MHz, 40 MHz or 80 MHz bandwidth.

In some implementations, a distribution of the subcarriers of the RU on the frequency subblock may be expressed by: $k_{dRU\_i} = k_{dRU} + K_{shift}(i)$. In such cases, $k_{dRU}$ denotes dRU subcarrier indices for the dRU on the 20 MHz, 40 MHz or 80 MHz bandwidth, $k_{dRU\_i}$ denotes dRU subcarrier indices on an $i^{th}$ frequency subblock, $K_{shift}(i)$ denotes a value of the constant shift, and i denotes a frequency subblock index of the plurality of frequency subblocks. In some implementations, the value of $K_{shift}(i)$ may include: (a) 120+K1st in an event that a size of each of the frequency subblocks is 20 MHz, (b) 244+K1st in an event that a size of each of the frequency subblocks is 40 MHz, and (c) 500+K1st in an event that a size of each of the frequency subblocks is 80 MHz. Moreover, K1st denotes a starting tone index of a corresponding frequency subblock i of size 20 MHz, 40 MHz or 80 MHz. In some implementations, responsive to the wide bandwidth being 80 MHz, the value of $K_{shift}(i)$ may include: (a) [−380, −133, 132, 379] in an event that a size of each of the frequency subblocks is 20 MHz, (b) [−256, 256] in an event that a size of each of the frequency subblocks is 40 MHz, and (c) 0 in an event that a size of each of the frequency subblocks is 80 MHz. In some implementations, responsive to the wide bandwidth being 160 MHz, the value of $K_{shift}(i)$ may include: (a) [−892, −645, −380, −133, 132, 379, 644, 891] in an event that a size of each of the frequency subblocks is 20 MHz, (b) [−768, −256, 256, 768] in an event that a size of each of the frequency subblocks is 40 MHz, and (c) [−512, 512] in an event that a size of each of the frequency subblocks is 80 MHz. In some implementations, responsive to the wide bandwidth being 320 MHz, the value of $K_{shift}(i)$ may include: (a) [−1916, −1669, −1404, −1157, −892, −645, −380, −133, 132, 379, 644, 891, 1156, 1403, 1668, 1915] in an event that a size of each of the frequency subblocks is 20 MHz, (b) [−1792, −1280, −768, −256, 256, 768, 1280, 1792] in an event that a size of each of the frequency subblocks is 40 MHz, and (c) [−1536, −512, 512, 1536] in an event that a size of each of the frequency subblocks is 80 MHz.

In some implementations, a distribution of the subcarriers of the RU on the frequency subblock may be expressed by: $k_{dRU\_M\_N} = k_{dRU\_i} + K_{shift1}(M) + K_{shift2}(N)$. In such cases, M denotes a 20 MHz or 40 MHz or 80 MHz subblock index within an 80 MHz frequency subblock or an 80 MHz bandwidth, N denotes an 80 MHz frequency subblock index in the wide bandwidth, $k_{dRU}$ denotes dRU subcarrier indices for the dRU on the 20 MHz, 40 MHz or 80 MHz bandwidth, $k_{dRU\_M\_N}$ denotes dRU subcarrier indices on an $M^{th}$ 20 MHz or 40 MHz or 80 MHz subblock of an $N^{th}$ 80 MHz frequency subblock in the wide bandwidth, $K_{shift1}(M)$ denotes a value of the constant shift for the $M^{th}$ 20 MHz or 40 MHz subblock within the 80 MHz frequency subblock or 80 MHz bandwidth, and $K_{shift2}(N)$ denotes a value of the constant shift for the $N^{th}$ 80 MHz frequency subblock in a wide bandwidth of 80 MHz or 160 MHz or 320 MHz. In some implementations, the value of $K_{shift1}(M)$ may include: (a) [−380, −133, 132, 379] in an event that a size of each of the frequency subblocks is 20 MHz within the 80 MHz frequency subblock or 80 MHz bandwidth, (b) [−256, 256] in an event that a size of each of the frequency subblocks is 40 MHz within the 80 MHz frequency subblock or 80 MHz bandwidth, and (c) 0 in an event that a size of each of the frequency subblocks or bandwidth is 80 MHz. In some implementations, the value of $K_{shift2}(N)$ may include: (a) 0 in an event that the wide bandwidth is 80 MHz, (b) [−512, 512] in an event that the wide bandwidth is 160 MHz, and (c) [−1536, −512, 512, 1536] in an event that the wide bandwidth is 320 MHz.

In some implementations, the subcarriers of the RU may be distributed on the frequency block by applying the constant shift to a 26-tone, 52-tone or 106-tone dRU on the 20 MHz bandwidth. In such cases, data and pilot subcarrier indices of the 26-tone dRU over the 20 MHz bandwidth may include [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−112:9:−4, 5:9:113] for a 26-tone dRU5, [−119:9:−11, 7:9:115] for a 26-tone dRU6, [−115:9:−7, 11:9:119] for a 26-tone dRU7, [−117:9:−9, 9:9:117] for a 26-tone dRU8 and [−113:9:−5, 4:9:112] for a 26-tone dRU9. Additionally, data and pilot subcarrier indices of the 52-tone dRU over the 20 MHz bandwidth may include 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4. Moreover, data and pilot subcarrier indices of the 106-tone dRU over the 20 MHz bandwidth may include 26-tone [dRU1~dRU4], [−3, 3] for a 106-tone dRU1 and 26-tone [dRU6~dRU9], [−2, 2] for a 106-tone dRU2.

In some implementations, the subcarriers of the RU may be distributed on the frequency block by applying the constant shift to a 26-tone, 52-tone, 106-tone or 242-tone dRU on the 40 MHz bandwidth. In such cases, data and pilot subcarrier indices of the 26-tone dRU over the 40 MHz bandwidth may include [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:−12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18. Additionally, data and pilot subcarrier indices of the 52-tone dRU over the 40 MHz bandwidth may include [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8. Moreover, data and pilot subcarrier indices of the 106-tone dRU over the 40 MHz bandwidth may include 26-tone [dRU1~dRU4], [−8, 5] for a 106-tone dRU1, 26-tone [dRU6~dRU9], [−6, 7] for a 106-tone dRU2, 26-tone [dRU10~dRU13], [−7, 6] for a 106-tone dRU3 and 26-tone [dRU15~dRU18], [−5, 8] for a 106-tone dRU4, and wherein data and pilot subcarrier indices of the 242-tone dRU over the 40 MHz bandwidth comprise 106-tone [dRU1~dRU2], 26-tone dRU5, [−244, −4, 3, 9] for a 242-tone dRU1 and 106-tone [dRU3~dRU4], 26-tone dRU14, [−243, −3, 4, 244] for a 242-tone dRU2.

In some implementations, the subcarriers of the RU may be distributed on the frequency block by applying the constant shift to a 52-tone, 106-tone, 242-tone or 484-tone dRU on the 80 MHz bandwidth. In such cases, data and pilot subcarrier indices of the 52-tone dRU over the 80 MHz bandwidth may include [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRU5, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16. Additionally, data and pilot subcarrier indices of the 106-tone dRU over the 80 MHz bandwidth may include 52-tone [dRU1~dRU2], [−495, 485] for a 106-tone dRU1, 52-tone [dRU3~dRU4], [−491, 489] for a 106-tone dRU2, 52-tone [dRU5~dRU6], [−489, 494] for a 106-tone dRU3, 52-tone [dRU7~dRU8], [−493, 487] for a 106-tone dRU4, 52-tone [dRU9~dRU10], [−494, 486] for a 106-tone dRU5, 52-tone [dRU11~dRU12], [−490, 490] for a 106-tone dRU6, 52-tone [dRU13~dRU14], [−488, 492] for a 106-tone dRU7 and 52-tone [dRU15~dRU16], [−492, 488] for a 106-tone dRU8. Moreover, data and pilot subcarrier indices of the 242-tone dRU over the 80 MHz bandwidth may include [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4. Furthermore, data and pilot subcarrier indices of the 484-tone dRU over the 80 MHz bandwidth may include [−499:2:−17, 17:2:499] for a 484-tone dRU1 and [−498:2:−16, 18:2:500] for a 484-tone dRU2.

Under another proposed scheme in accordance with the present disclosure with respect to designs of a dRU on a frequency subblock of a wide-bandwidth PPDU in 6 GHz LPI systems, processor 3012 of apparatus 3010 may generate a dRU with subcarriers of the dRU distributed on a frequency subblock of two or more frequency subblocks in a bandwidth. Furthermore, processor 3012 may communicate, via transceiver 3016, with apparatus 3020 using the dRU.

In some implementations, the dRU may be generated on: (a) a 20 MHz frequency subblock with the bandwidth being 40 MHz, 80 MHz, 160 MHz or 320 MHz, or (b) a 40 MHz frequency subblock with the bandwidth being 80 MHz, 160 MHz or 320 MHz, or (c) an 80 MHz frequency subblock with the bandwidth being 160 MHz or 320 MHz, or (d) a 160 MHz frequency subblock with the bandwidth being 320 MHz.

In some implementations, the tone indices of the dRU may be expressed as: $dRU_{BW20}+(-K1st\_bw20+K1st)$. In such cases, dRUBW20 denotes dRU indices on a 20 MHz bandwidth or frequency subblock or segment, K1st denotes a first left-hand side tone of each frequency subblock of the one or more frequency subblocks and is subblock-dependent, and K1st_bw20 denotes a first left-hand side tone of an overall dRU table on the 20 MHz bandwidth or frequency subblock or segment. In some implementations, a value of the K1st may include: (a) −500 for a first 20 MHz frequency subblock of the one or more frequency subblocks in an 80 MHz bandwidth; (b) −253 for a second 20 MHz frequency subblock of the one or more frequency subblocks in the 80 MHz bandwidth; (c) 12 for a third 20 MHz frequency subblock of the one or more frequency subblocks in the 80 MHz bandwidth; and (d) 259 for a fourth 20 MHz frequency subblock of the one or more frequency subblocks in the 80 MHz bandwidth.

In some implementations, the tone indices of the dRU may be expressed as: dRU=Tone-Range (dTP). In such cases, Tone-Range denotes a range of tones on each frequency subblock of the one or more frequency subblocks and is subblock-dependent, and dTP denotes a table of indices of positive integers representing a tone distribution pattern. In some implementations, the Tone-Range may include: (a) [−500:−259] for a first 20 MHz frequency subblock of the one or more frequency subblocks in an 80 MHz bandwidth; (b) −[253:−12] for a second 20 MHz frequency subblock of the one or more frequency subblocks in the 80 MHz bandwidth; (c) [12:253] for a third 20 MHz frequency subblock of the one or more frequency subblocks in the 80 MHz bandwidth; and (d) [259:500] for a fourth 20 MHz frequency subblock of the one or more frequency subblocks in the 80 MHz bandwidth.

In some implementations, the tone indices of the dRU may be expressed as: $k=K1st+k_{td}$. In such cases, k denotes the tone indices of the dRU, K1st denotes a first left-hand side tone of each frequency subblock of the one or more frequency subblocks and is subblock-dependent, and $k_{td}$ denotes a tone distribution pattern of $K_{td}(r, k) = RU_{start}(r) + l_i + j*N_p$. Moreover, $i=0, 1, 2, \ldots, L-1; j=0, 1, 2, \ldots,$ $$\left\lceil \frac{N_{st\_ru}}{L} \right\rceil - 1;$$

$k=0, 1, 2, \ldots, N_{st\_ru}-1; r=1, 2, \ldots, N_{ru}$, with r being a logical resource unit (RU) index; $l_i \in \Omega_{ru} = \{l_0, l_1, \ldots, l_{L-1}\}$; $L=|\Omega_{ru}|$; $N_{st\_ru}=26, 52, 106, 242, 484, 996$ for a 26-tone, 52-tone, 106-tone, 242-tone, 484-tone or 996-tone RU, respectively. Furthermore, $RU_{start}(r)$ represents a first or starting tone index for $dRU_r$, $l_i$ represents tones within one repetition distance or one repetition period, $N_p$ represents a repetition distance or repetition period, L represents a number of tones within one repetition distance or one repetition period, $N_{st\_ru}$ represents a number of subcarriers for the dRU, and $N_{ru}$ represents a number of RUs for a given RU size in a given bandwidth.

In some implementations, a predefined number of DC tones are reserved around a middle of each frequency subblock of the one or more frequency subblocks.

Illustrative Processes

FIG. 31 illustrates an example process 3100 in accordance with an implementation of the present disclosure. Process 3100 may represent an aspect of implementing various proposed designs, concepts, schemes, systems and methods described above. More specifically, process 3100 may represent an aspect of the proposed concepts and schemes pertaining to designs of a dRU on a frequency subblock of a wide-bandwidth PPDU in 6 GHz LPI systems in accordance with the present disclosure. Process 3100 may include one or more operations, actions, or functions as illustrated by one or more of blocks 3110 and 3120. Although illustrated as discrete blocks, various blocks of process 3100 may be divided into additional blocks, combined into fewer blocks, or eliminated, depending on the desired implementation. Moreover, the blocks/sub-blocks of process 3100 may be executed in the order shown in FIG. 31 or, alternatively in a different order. Furthermore, one or more of the blocks/sub-blocks of process 3100 may be executed repeatedly or iteratively. Process 3100 may be implemented by or in apparatus 3010 and apparatus 3020 as well as any variations thereof. Solely for illustrative purposes and without limiting the scope, process 3100 is described below in the context of apparatus 3010 as communication entity 110 (e.g., a transmitting device whether a STA or an AP) and apparatus 3020 as communication entity 120 (e.g., a receiving device whether a STA or an AP) of a wireless network such as a WLAN in accordance with one or more of IEEE 802.11 standards. Process 3100 may begin at block 3110.

At 3110, process 3100 may involve processor 3012 of apparatus 3010 generating a PPDU with subcarriers of a RU distributed on a frequency subblock of a plurality of frequency subblocks of a wide bandwidth. Process 3100 may proceed from 3110 to 3120.

At 3120, process 3100 may involve processor 3012 transmitting, via transceiver 3016, the PPDU (e.g., to apparatus 3020) over the wide bandwidth.

In some implementations, each of the plurality of frequency subblocks may be a 20 MHz, 40 MHz or 80 MHz frequency subblock. Additionally, the wide bandwidth may be an 80 MHz, 160 MHz or 320 MHz bandwidth. Moreover, the subcarriers of the RU may be distributed on the frequency subblock by applying a constant shift to a dRU on a 20 MHz, 40 MHz or 80 MHz bandwidth.

In some implementations, a distribution of the subcarriers of the RU on the frequency subblock may be expressed by: $k_{dRU\_i} = k_{dRU} + K_{shift}(i)$. In such cases, $k_{dRU}$ denotes dRU subcarrier indices for the dRU on the 20 MHz, 40 MHz or 80 MHz bandwidth, $k_{dRU\_i}$ denotes dRU subcarrier indices on an $i^{th}$ frequency subblock, $K_{shift}(i)$ denotes a value of the constant shift, and i denotes a frequency subblock index of the plurality of frequency subblocks. In some implementations, the value of $K_{shift}(i)$ may include: (a) 120+K1st in an event that a size of each of the frequency subblocks is 20 MHz, (b) 244+K1st in an event that a size of each of the frequency subblocks is 40 MHz, and (c) 500+K1st in an event that a size of each of the frequency subblocks is 80 MHz. Moreover, K1st denotes a starting tone index of a corresponding frequency subblock i of size 20 MHz, 40 MHz or 80 MHz. In some implementations, responsive to the wide bandwidth being 80 MHz, the value of $K_{shift}(i)$ may include: (a) [−380, −133, 132, 379] in an event that a size of each of the frequency subblocks is 20 MHz, (b) [−256, 256] in an event that a size of each of the frequency subblocks is 40 MHz, and (c) 0 in an event that a size of each of the frequency subblocks is 80 MHz. In some implementations, responsive to the wide bandwidth being 160 MHz, the value of $K_{shift}(I)$ may include: (a) [−892, −645, −380, −133, 132, 379, 644, 891] in an event that a size of each of the frequency subblocks is 20 MHz, (b) [−768, −256, 256, 768] in an event that a size of each of the frequency subblocks is 40 MHz, and (c) [−512, 512] in an event that a size of each of the frequency subblocks is 80 MHz. In some implementations, responsive to the wide bandwidth being 320 MHz, the value of $K_{shift}(I)$ may include: (a) [−1916, −1669, −1404, −1157, −892, −645, −380, −133, 132, 379, 644, 891, 1156, 1403, 1668, 1915] in an event that a size of each of the frequency subblocks is 20 MHz, (b) [−1792, −1280, −768, −256, 256, 768, 1280, 1792] in an event that a size of each of the frequency subblocks is 40 MHz, and (c) [−1536, −512, 512, 1536] in an event that a size of each of the frequency subblocks is 80 MHz.

In some implementations, a distribution of the subcarriers of the RU on the frequency subblock may be expressed by: $k_{dRU\_M\_N} = k_{dRU\_i} + K_{shift1}(M) + K_{shift2}(N)$. In such cases, M denotes a 20 MHz or 40 MHz or 80 MHz subblock index within an 80 MHz frequency subblock or an 80 MHz bandwidth, N denotes an 80 MHz frequency subblock index in the wide bandwidth, $k_{dRU}$ denotes dRU subcarrier indices for the dRU on the 20 MHz, 40 MHz or 80 MHz bandwidth, $k_{dRU\_M\_N}$ denotes dRU subcarrier indices on an $M^{th}$ 20 MHz or 40 MHz or 80 MHz subblock of an $N^{th}$ 80 MHz frequency subblock in the wide bandwidth, $K_{shift1}(M)$ denotes a value of the constant shift for the $M^{th}$ 20 MHz or 40 MHz subblock within the 80 MHz frequency subblock or 80 MHz bandwidth, and $K_{shift2}(N)$ denotes a value of the constant shift for the $N^{th}$ 80 MHz frequency subblock in a wide bandwidth of 80 MHz or 160 MHz or 320 MHz. In some implementations, the value of $K_{shift1}(M)$ may include: (a) [−380, −133, 132, 379] in an event that a size of each of the frequency subblocks is 20 MHz within the 80 MHz frequency subblock or 80 MHz bandwidth, (b) [−256, 256] in an event that a size of each of the frequency subblocks is 40 MHz within the 80 MHz frequency subblock or 80 MHz bandwidth, and (c) 0 in an event that a size of each of the frequency subblocks or bandwidth is 80 MHz. In some implementations, the value of $K_{shift2}(N)$ may include: (a) 0 in an event that the wide bandwidth is 80 MHz, (b) [−512, 512] in an event that the wide bandwidth is 160 MHz, and (c) [−1536, −512, 512, 1536] in an event that the wide bandwidth is 320 MHz.

In some implementations, the subcarriers of the RU may be distributed on the frequency block by applying the constant shift to a 26-tone, 52-tone or 106-tone dRU on the 20 MHz bandwidth. In such cases, data and pilot subcarrier indices of the 26-tone dRU over the 20 MHz bandwidth may include [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−112:9:−4, 5:9:113] for a 26-tone dRU5, [−119:9:−11, 7:9:115] for a 26-tone dRU6, [−115:9:−7, 11:9:119] for a 26-tone dRU7, [−117:9:−9, 9:9:117] for a 26-tone dRU8 and [−113:9:−5, 4:9:112] for a 26-tone dRU9. Additionally, data and pilot subcarrier indices of the 52-tone dRU over the 20 MHz bandwidth may include 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4. Moreover, data and pilot subcarrier indices of the 106-tone dRU over the 20 MHz bandwidth may include 26-tone [dRU1~dRU4], [−3, 3] for a 106-tone dRU1 and 26-tone [dRU6~dRU9], [−2, 2] for a 106-tone dRU2.

In some implementations, the subcarriers of the RU may be distributed on the frequency block by applying the constant shift to a 26-tone, 52-tone, 106-tone or 242-tone dRU on the 40 MHz bandwidth. In such cases, data and pilot subcarrier indices of the 26-tone dRU over the 40 MHz bandwidth may include [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:−12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18. Additionally, data and pilot subcarrier indices of the 52-tone dRU over the 40 MHz bandwidth may include [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8. Moreover, data and pilot subcarrier indices of the 106-tone dRU over the 40 MHz bandwidth may include 26-tone [dRU1~dRU4], [−8, 5] for a 106-tone dRU1, 26-tone [dRU6~dRU9], [−6, 7] for a 106-tone dRU2, 26-tone [dRU10~dRU13], [−7, 6] for a 106-tone dRU3 and 26-tone [dRU15~dRU18], [−5, 8] for a 106-tone dRU4, and wherein data and pilot subcarrier indices of the 242-tone dRU over the 40 MHz bandwidth comprise 106-tone [dRU1~dRU2], 26-tone dRU5, [−244, −4, 3, 9] for a 242-tone dRU1 and 106-tone [dRU3~dRU4], 26-tone dRU14, [−243, −3, 4, 244] for a 242-tone dRU2.

In some implementations, the subcarriers of the RU may be distributed on the frequency block by applying the constant shift to a 52-tone, 106-tone, 242-tone or 484-tone dRU on the 80 MHz bandwidth. In such cases, data and pilot subcarrier indices of the 52-tone dRU over the 80 MHz bandwidth may include [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRU5, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16. Additionally, data and pilot subcarrier indices of the 106-tone dRU over the 80 MHz bandwidth may include 52-tone [dRU1~dRU2], [−495, 485] for a 106-tone dRU1, 52-tone [dRU3~dRU4], [−491, 489] for a 106-tone dRU2, 52-tone [dRU5~dRU6], [−489, 491] for a 106-tone dRU3, 52-tone [dRU7~dRU8], [−493, 487] for a 106-tone dRU4, 52-tone [dRU9~dRU10], [−494, 486] for a 106-tone dRU5, 52-tone [dRU11~dRU12], [−490, 490] for a 106-tone dRU6, 52-tone [dRU13~dRU14], [−488, 492] for a 106-tone dRU7 and 52-tone [dRU15~dRU16], [−492, 488] for a 106-tone dRU8. Moreover, data and pilot subcarrier indices of the 242-tone dRU over the 80 MHz bandwidth may include [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4. Furthermore, data and pilot subcarrier indices of the 484-tone dRU over the 80 MHz bandwidth may include [−499:2:−17, 17:2:499] for a 484-tone dRU1 and [−498:2:−16, 18:2:500] for a 484-tone dRU2.

FIG. 32 illustrates an example process 3200 in accordance with an implementation of the present disclosure. Process 3200 may represent an aspect of implementing various proposed designs, concepts, schemes, systems and methods described above. More specifically, process 3200 may represent an aspect of the proposed concepts and schemes pertaining to designs of a dRU on a frequency subblock of a wide-bandwidth PPDU in 6 GHz LPI systems in accordance with the present disclosure. Process 3200 may include one or more operations, actions, or functions as illustrated by one or more of blocks 3210 and 3220. Although illustrated as discrete blocks, various blocks of process 3200 may be divided into additional blocks, combined into fewer blocks, or eliminated, depending on the desired implementation. Moreover, the blocks/sub-blocks of process 3200 may be executed in the order shown in FIG. 32 or, alternatively in a different order. Furthermore, one or more of the blocks/sub-blocks of process 3200 may be executed repeatedly or iteratively. Process 3200 may be implemented by or in apparatus 3010 and apparatus 3020 as well as any variations thereof. Solely for illustrative purposes and without limiting the scope, process 3200 is described below in the context of apparatus 3010 as communication entity 110 (e.g., a transmitting device whether a STA or an AP) and apparatus 3020 as communication entity 120 (e.g., a receiving device whether a STA or an AP) of a wireless network such as a WLAN in accordance with one or more of IEEE 802.11 standards. Process 3200 may begin at block 3210.

At 3210, process 3200 may involve processor 3012 of apparatus 3010 generating a dRU with subcarriers of the dRU distributed on a frequency subblock of two or more frequency subblocks in a bandwidth. Process 3200 may proceed from 3210 to 3220.

At 3220, process 3200 may involve processor 3012 communicating, via transceiver 3016, with apparatus 3020 using the dRU.

In some implementations, the dRU may be generated on: (a) a 20 MHz frequency subblock with the bandwidth being 40 MHz, 80 MHz, 160 MHz or 320 MHz, or (b) a 40 MHz frequency subblock with the bandwidth being 80 MHz, 160 MHz or 320 MHz, or (c) an 80 MHz frequency subblock with the bandwidth being 160 MHz or 320 MHz, or (d) a 160 MHz frequency subblock with the bandwidth being 320 MHz.

In some implementations, the tone indices of the dRU may be expressed as: $dRU_{BW20}+(-K1st\_bw20+K1st)$. In such cases, dRUBW20 denotes dRU indices on a 20 MHz bandwidth or frequency subblock or segment, K1st denotes a first left-hand side tone of each frequency subblock of the one or more frequency subblocks and is subblock-dependent, and K1st_bw20 denotes a first left-hand side tone of an overall dRU table on the 20 MHz bandwidth or frequency subblock or segment. In some implementations, a value of the K1st may include: (a) −500 for a first 20 MHz frequency subblock of the one or more frequency subblocks in an 80 MHz bandwidth; (b) −253 for a second 20 MHz frequency subblock of the one or more frequency subblocks in the 80 MHz bandwidth; (c) 12 for a third 20 MHz frequency subblock of the one or more frequency subblocks in the 80 MHz bandwidth; and (d) 259 for a fourth 20 MHz frequency subblock of the one or more frequency subblocks in the 80 MHz bandwidth.

In some implementations, the tone indices of the dRU may be expressed as: dRU=Tone-Range (dTP). In such cases, Tone-Range denotes a range of tones on each frequency subblock of the one or more frequency subblocks and is subblock-dependent, and dTP denotes a table of indices of positive integers representing a tone distribution pattern. In some implementations, the Tone-Range may include: (a) [−500:−259] for a first 20 MHz frequency subblock of the one or more frequency subblocks in an 80 MHz bandwidth; (b) −[253:−12] for a second 20 MHz frequency subblock of the one or more frequency subblocks in the 80 MHz bandwidth; (c) [12:253] for a third 20 MHz frequency subblock of the one or more frequency subblocks in the 80 MHz bandwidth; and (d) [259:500] for a fourth 20 MHz frequency subblock of the one or more frequency subblocks in the 80 MHz bandwidth.

In some implementations, the tone indices of the dRU may be expressed as: $k=K1st+k_{td}$. In such cases, k denotes the tone indices of the dRU, K1st denotes a first left-hand side tone of each frequency subblock of the one or more frequency subblocks and is subblock-dependent, and $k_{td}$ denotes a tone distribution pattern of $K_{td}(r, k)=RU_{start}(r)+l_i+j*N_p$. Moreover, i=0, 1, 2, . . . , L−1; j=0, 1, 2, . . . , $$\left\lceil \frac{N_{st\_ru}}{L} \right\rceil - 1;$$

k=0, 1, 2, . . . , $N_{st\_ru}-1$; r=1, 2, . . . , $N_{ru}$, with r being a logical resource unit (RU) index; $l_i \in \Omega_{ru}=\{l_0, l_1, \ldots, l_{L-1}\}$;

$L = |\Omega_{ru}|$; $N_{st\_ru} = 26, 52, 106, 242, 484, 996$ for a 26-tone, 52-tone, 106-tone, 242-tone, 484-tone or 996-tone RU, respectively. Furthermore, $RU_{start}(r)$ represents a first or starting tone index for $dRU_r$, $l_i$ represents tones within one repetition distance or one repetition period, $N_p$ represents a repetition distance or repetition period, L represents a number of tones within one repetition distance or one repetition period, $N_{st\_ru}$ represents a number of subcarriers for the dRU, and $N_{ru}$ represents a number of RUs for a given RU size in a given bandwidth.

In some implementations, a predefined number of DC tones are reserved around a middle of each frequency subblock of the one or more frequency subblocks.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
generating a physical-layer protocol data unit (PPDU) with subcarriers of a resource unit (RU) distributed on a frequency subblock of a plurality of frequency subblocks of a wide bandwidth; and
transmitting the PPDU over the wide bandwidth,
wherein each of the plurality of frequency subblocks comprises a 20 MHz, 40 MHz or 80 MHz frequency subblock,
wherein the wide bandwidth comprises an 80 MHz, 160 MHz or 320 MHz bandwidth,
wherein the subcarriers of the RU are distributed on the frequency block by applying a constant shift to a distributed-tone RU (dRU) on a 20 MHz, 40 MHz or 80 MHz bandwidth, and
wherein a distribution of the subcarriers of the RU on the frequency subblock is expressed by:

$$k_{dRU\_i} = k_{dRu} + K_{shift}(i),$$

wherein:
$k_{dRu}$ denotes dRU subcarrier indices for the dRU on the 20 MHz, 40 MHz or 80 MHz bandwidth,
$k_{dRu}$ i denotes dRU subcarrier indices on an $i^{th}$ frequency subblock,
$k_{shift}(i)$ denotes a value of the constant shift, and
i denotes a frequency subblock index of the plurality of frequency subblocks.

2. The method of claim 1, wherein the value of K_{shift}(i) comprises:
   120+K1st in an event that a size of each of the frequency subblocks is 20 MHZ,
   244+K1st in an event that a size of each of the frequency subblocks is 40 MHz,
   500+K1st in an event that a size of each of the frequency subblocks is 80 MHz, and wherein K1st denotes a starting tone index of a corresponding frequency subblock i of size 20 MHz, 40 MHz or 80 MHz.

3. The method of claim 1, wherein, responsive to the wide bandwidth being 80 MHz, the value of K_{shift}(i) comprises:
   [−380,−133, 132, 379] in an event that a size of each of the frequency subblocks is 20 MHZ,
   [−256, 256] in an event that a size of each of the frequency subblocks is 40 MHZ, and
   0 in an event that a size of each of the frequency subblocks is 80 MHz.

4. The method of claim 1, wherein, responsive to the wide bandwidth being 160 MHz, the value of K_{shift}(i) comprises:
   [−892, −645, −380, −133, 132, 379, 644, 891] in an event that a size of each of the frequency subblocks is 20 MHz,
   [−768,−256, 256, 768] in an event that a size of each of the frequency subblocks is 40 MHz, and
   [−512, 512] in an event that a size of each of the frequency subblocks is 80 MHz.

5. The method of claim 1, wherein, responsive to the wide bandwidth being 320 MHz, the value of K_{shift}(i) comprises:
   [−1916,−1669,−1404,−1157,−892,−645,−380,−133, 132, 379, 644, 891, 1156, 1403, 1668, 1915] in an event that a size of each of the frequency subblocks is 20 MHZ,
   [−1792,−1280,−768,−256, 256, 768, 1280, 1792] in an event that a size of each of the frequency subblocks is 40 MHz, and
   [−1536,−512, 512, 1536] in an event that a size of each of the frequency subblocks is 80 MHz.

6. The method of claim 1, wherein the subcarriers of the RU are distributed on the frequency block by applying the constant shift to a 26-tone, 52-tone or 106-tone dRU on the 20 MHz bandwidth, wherein data and pilot subcarrier indices of the 26-tone dRU over the 20 MHz bandwidth comprise [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−112:9:−4, 5:9:113] for a 26-tone dRU5, [−119:9:−11, 7:9:115] for a 26-tone dRU6, [−115:9:−7, 11:9:119] for a 26-tone dRU7, [−117:9:9, 9:9:117] for a 26-tone dRU8 and [−113:9:−5, 4:9:112] for a 26-tone dRU9, wherein data and pilot subcarrier indices of the 52-tone dRU over the 20 MHz bandwidth comprise 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4, and wherein data and pilot subcarrier indices of the 106-tone dRU over the 20 MHz bandwidth comprise 26-tone [dRU1~dRU4], [−3, 3] for a 106-tone dRU1 and 26-tone [dRU6~dRU9], [−2, 2] for a 106-tone dRU2.

7. The method of claim 1, wherein the subcarriers of the RU are distributed on the frequency block by applying the constant shift to a 26-tone, 52-tone, 106-tone or 242-tone dRU on the 40 MHz bandwidth, wherein data and pilot subcarrier indices of the 26-tone dRU over the 40 MHz bandwidth comprise [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18, wherein data and pilot subcarrier indices of the 52-tone dRU over the 40 MHz bandwidth comprise [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8, wherein data and pilot subcarrier indices of the 106-tone dRU over the 40 MHz bandwidth comprise 26-tone [dRU1~dRU4], [−8, 5] for a 106-tone dRU1, 26-tone [dRU6~dRU9], [−6, 7] for a 106-tone dRU2, 26-tone [dRU10~dRU13], [−7, 6] for a 106-tone dRU3 and 26-tone [dRU15~dRU18], [−5, 8] for a 106-tone dRU4, and wherein data and pilot subcarrier indices of the 242-tone dRU over the 40 MHz bandwidth comprise 106-tone [dRU1~dRU2], 26-tone dRU5, [−244,−4, 3, 9] for a 242-tone dRU1 and 106-tone [dRU3~dRU4], 26-tone dRU14, [−243,−3, 4, 244] for a 242-tone dRU2.

8. The method of claim 1, wherein the subcarriers of the RU are distributed on the frequency block by applying the constant shift to a 52-tone, 106-tone, 242-tone or 484-tone dRU on the 80 MHz bandwidth, wherein data and pilot subcarrier indices of the 52-tone dRU over the 80 MHz bandwidth comprise [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRU5, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16, wherein data and pilot subcarrier indices of the 106-tone dRU over the 80 MHz bandwidth comprise 52-tone [dRU1~dRU2], [−495, 485] for a 106-tone dRU1, 52-tone [dRU3~dRU4], [−491, 489] for a 106-tone dRU2, 52-tone [dRU5~dRU6], [−489, 491] for a 106-tone dRU3, 52-tone [dRU7~dRU8], [−493, 487] for a 106-tone dRU4, 52-tone [dRU9~dRU10], [−494, 486] for a 106-tone dRU5, 52-tone [dRU11~dRU12], [−490, 490] for a 106-tone dRU6, 52-tone [dRU13~dRU14], [−488, 492] for a 106-tone dRU7 and 52-tone [dRU15~dRU16], [−492, 488] for a 106-tone dRU8, wherein data and pilot subcarrier indices of the 242-tone dRU over the 80 MHz bandwidth comprise [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4, and wherein data and pilot subcarrier indices of the 484-tone dRU over the 80 MHz bandwidth comprise [−499:2:−17, 17:2:499] for a 484-tone dRU1 and [−498:2:−16, 18:2:500] for a 484-tone dRU2.

9. A method, comprising:
generating a distributed-tone resource unit (dRU) with subcarriers of the dRU distributed on a frequency subblock of two or more frequency subblocks in a bandwidth; and
communicating using the dRU,
wherein the dRU is generated on:
a 20 MHz frequency subblock with the bandwidth being 40 MHz, 80 MHZ, 160 MHz or 320 MHz, or
a 40 MHz frequency subblock with the bandwidth being 80 MHz, 160 MHz or 320 MHz, or
an 80 MHz frequency subblock with the bandwidth being 160 MHz or 320 MHz, or
a 160 MHz frequency subblock with the bandwidth being 320 MHZ,
wherein tone indices of the dRU are expressed as:
$dRU_{BW20}+(-K1st\_bw20+K1st)$, or
dRU=Tone-Range (dTP), or
$k=K1st+K_{td}$,
wherein:
$dRU_{BW20}$ denotes dRU indices on a 20 MHz bandwidth,
K1st denotes a first left-hand side tone of each frequency subblock of the one or more frequency subblocks and is subblock-dependent,
K1st_bw20 denotes a first left-hand side tone of an overall dRU table on the 20 MHz bandwidth,
Tone-Range denotes a range of tones on each frequency subblock of the one or more frequency subblocks and is subblock-dependent,
dTP denotes a table of indices of positive integers representing a tone distribution pattern,
k denotes the tone indices of the dRU,
$k_{td}$ denotes a tone distribution pattern of $K_{td}(r, k)=RU_{start}(r)+l_i+j*N_p$, and
wherein:
i=0, 1, 2, . . . , L−1; j=0, 1, 2, . . .

$$\left\lceil \frac{N_{st\_ru}}{L} \right\rceil - 1;$$

k=0, 1, 2, . . . , $N_{st\_ru}$−1; r=1, 2, . . . $N_{ru}$, with r being a logical resource unit (RU) index; $l_i \in \Omega_{ru}=\{1, \ldots . l_{L-1}\}$; L=$|\Omega_{ru}|$; $N_{st\_ru}$=26, 52,106, 242, 484, 996 for a 26-tone, 52-tone, 106-tone, 242-tone, 484-tone or 996-tone RU, respectively,
$RU_{start}(r)$ represents a first or starting tone index for $dRU_r$,
$l_i$ represents tones within one repetition distance or one repetition period,
$N_p$ represents a repetition distance or repetition period,
L represents a number of tones within one repetition distance or one repetition period,
$N_{st\_ru}$ represents a number of subcarriers for the dRU, and $N_{ru}$ represents a number of RUs for a given RU size in a given bandwidth.

10. The method of claim 9, wherein a value of the K1st comprises:
−500 for a first 20 MHz frequency subblock of the one or more frequency subblocks in an 80 MHz bandwidth;
−253 for a second 20 MHz frequency subblock of the one or more frequency subblocks in the 80 MHz bandwidth;
12 for a third 20 MHz frequency subblock of the one or more frequency subblocks in the 80 MHz bandwidth; and
259 for a fourth 20 MHz frequency subblock of the one or more frequency subblocks in the 80 MHz bandwidth.

11. The method of claim 9, wherein the Tone-Range comprises:
[−500:−259] for a first 20 MHz frequency subblock of the one or more frequency subblocks in an 80 MHz bandwidth;
−[253:−12] for a second 20 MHz frequency subblock of the one or more frequency subblocks in the 80 MHz bandwidth;
[12:253] for a third 20 MHz frequency subblock of the one or more frequency subblocks in the 80 MHz bandwidth; and
[259:500] for a fourth 20 MHz frequency subblock of the one or more frequency subblocks in the 80 MHz bandwidth.

12. The method of claim 9, wherein a predefined number of direct-current (DC) tones are reserved around a middle of each frequency subblock of the one or more frequency subblocks.

13. An apparatus, comprising:
a transceiver configured to communicate wirelessly; and
a processor coupled to the transceiver and configured to perform operations comprising:
generating a physical-layer protocol data unit (PPDU) with subcarriers of a resource unit (RU) distributed on a frequency subblock of a plurality of frequency subblocks of a wide bandwidth; and
transmitting, via the transceiver, the PPDU over the wide bandwidth,
wherein each of the plurality of frequency subblocks comprises a 20 MHz, 40 MHz or 80 MHz frequency subblock,
wherein the wide bandwidth comprises an 80 MHz, 160 MHz or 320 MHz bandwidth,
wherein the subcarriers of the RU are distributed on the frequency block by applying a constant shift to a distributed-tone RU (dRU) on a 20 MHz, 40 MHz or 80 MHz bandwidth, and
wherein a distribution of the subcarriers of the RU on the frequency subblock is expressed by:

$k_{dRU\_i}=k_{dRU}+K_{shift}(i)$ wherein:
$k_{dRU}$ denotes dRU subcarrier indices for the dRU on the 20 MHz, 40 MHz or 80 MHz bandwidth,
$k_{dRu\_i}$ denotes dRU subcarrier indices on an $i^{th}$ frequency subblock,
$k_{shift}$ (i) denotes a value of the constant shift, and
i denotes a frequency subblock index of the plurality of frequency subblocks.

* * * * *